United States Patent
Sjöberg et al.

(10) Patent No.: US 11,412,241 B2
(45) Date of Patent: Aug. 9, 2022

(54) DECODING OR ENCODING DELTA TRANSFORM COEFFICIENTS

(71) Applicant: Telefonaktiebolaget LM Ericsson (publ), Stockholm (SE)

(72) Inventors: Rickard Sjöberg, Stockholm (SE); Christopher Hollmann, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/977,851

(22) PCT Filed: Feb. 21, 2019

(86) PCT No.: PCT/EP2019/054355
§ 371 (c)(1),
(2) Date: Sep. 3, 2020

(87) PCT Pub. No.: WO2019/170431
PCT Pub. Date: Sep. 12, 2019

(65) Prior Publication Data
US 2021/0029369 A1     Jan. 28, 2021

Related U.S. Application Data

(60) Provisional application No. 62/639,028, filed on Mar. 6, 2018.

(51) Int. Cl.
*H04N 11/02* (2006.01)
*H04N 19/40* (2014.01)
(Continued)

(52) U.S. Cl.
CPC .......... *H04N 19/40* (2014.11); *H04N 19/176* (2014.11); *H04N 19/46* (2014.11); *H04N 19/60* (2014.11)

(58) Field of Classification Search
CPC ........................................................ H04N 19/40
(Continued)

(56) References Cited

U.S. PATENT DOCUMENTS 6,037,987 A * 3/2000 Sethuraman ......... H04N 19/176
375/240.03
6,775,325 B1 * 8/2004 Florencio ............... H04N 19/40
375/240.03
(Continued)

FOREIGN PATENT DOCUMENTS

WO       2018050226 A1       3/2018

OTHER PUBLICATIONS

International Search Report and Written Opinion issued in International Application No. PCT/SE2019/054355 dated Apr. 26, 2019 (12 pages).

(Continued)

*Primary Examiner* — Leron Beck
(74) *Attorney, Agent, or Firm* — Rothwell, Figg, Ernst & Manbeck, P.C.

(57) ABSTRACT

There are provided mechanisms of guided transcoding. The methods are performed by a decoder, for producing original transform coefficients, and by an encoder, for producing coded delta transform coefficients. A decoding method comprises deriving a predicted residual block. The decoding method comprises transforming the predicted residual block using a forward transform, thereby producing a plurality of original estimated coefficients, the plurality of OECs comprising a first OEC. The decoding method comprises quantizing the plurality of OECs, thereby producing a plurality of quantized estimated transform coefficients comprising a first ETC corresponding to the first OEC. The decoding method comprises selecting a category based on the first OEC. The decoding method comprises decoding a first coded delta (Continued)

transform coefficient (DTC) corresponding to the first OEC, thereby producing a first decoded DTC, wherein the decoding comprises using the selected category to decode the first coded DTC. The decoding method comprises computing a first original transform coefficient by adding the first decoded DTC to the first ETC.

21 Claims, 22 Drawing Sheets

(51) Int. Cl.
*H04N 19/176* (2014.01)
*H04N 19/46* (2014.01)
*H04N 19/60* (2014.01)

(58) Field of Classification Search
USPC ..................................... 375/240.01–240.29
See application file for complete search history.

(56) References Cited

U.S. PATENT DOCUMENTS

| | | | | |
|---|---|---|---|---|
| 2002/0001415 A1* | 1/2002 | Latva-Aho | ............. | H04N 19/60 382/251 |
| 2006/0008168 A1* | 1/2006 | Lee | ........................ | H04N 19/46 382/250 |
| 2013/0101022 A1* | 4/2013 | Amonou | ................ | H04N 19/18 375/240.2 |
| 2015/0016537 A1* | 1/2015 | Karczewicz | ........... | H04N 19/91 375/240.18 |
| 2017/0006283 A1* | 1/2017 | Zhou | ................... | H04N 19/172 |
| 2017/0064336 A1* | 3/2017 | Zhang | .................. | H04N 19/122 |
| 2018/0324427 A1* | 11/2018 | Cheong | ................ | H04N 19/176 |
| 2019/0045226 A1* | 2/2019 | Xu | ....................... | H04N 19/159 |

OTHER PUBLICATIONS

Kenneth Andersson et al., "Guided transcoding using deflation and inflation for NDVC", Ericsson, International Organisation for Standardisation Organisation Internationale De Normalisation ISO/IEC JTC1/SC29/WG11 Coding of Moving Pictures and Audio, Jan. 2017, Geneva, Switzerland (4 pages).

Jonatan Samuelsson et al., "Draft requirements for network distributed video coding" Requirements, International Organisation for Standardisation Organisation Internationale De Normalisation ISO/IEC JTC1/SC29/WG11 Coding of Moving Pictures and Audio, May/Jun. 2016, Geneva, CH (6 pages).

Christopher Hollmann, "Coding of Guiding Data for Video Transcoding", Uppsala Universitet, IT 16 092, Dec. 2016 (69 pages).

MPEG Requirements, "Call for Evidence on Transcoding for Network Distributed Video Coding", International Organization for Standardization Organisation Internationale De Normalisation, ISO/IEC JTC1/SC29/WG11, Coding of Moving Pictures and Audio, Jul. 2017, Torino, Italy (8 pages).

* cited by examiner

FIG. 7

DECODING OR ENCODING DELTA TRANSFORM COEFFICIENTS

CROSS REFERENCE TO RELATED APPLICATION(S)

This application is a 35 U.S.C. § 371 National Stage of International Patent Application No. PCT/EP2019/054355, filed Feb. 21, 2019, designating the United States and claiming priority to U.S. provisional application No. 62/639,028, filed on Mar. 6, 2018. The above identified applications are incorporated by reference.

TECHNICAL FIELD

Disclosed are embodiments related to video coding and, more particularly, quantized coefficient coding.

BACKGROUND

Video consumption is driving rapid growth of fixed and mobile network traffic. Being the dominant traffic type already today, video is expected to drive the overall network traffic to a multiple of today's volume and account for more than 70% of all network traffic within a few years. The growth is primarily driven by streamed video on-demand (VoD) content, as consumers increasingly demand access to any content on any device at any time. VoD services are commonly operated on cloud-based video platforms, wherein all processing is executed in software running on generic servers, as such platforms can provide beneficial properties related to scalability, cost efficiency, and ubiquitous availability.

VoD content is typically delivered using adaptive bit rate (ABR) streaming techniques, where each video asset (e.g., movie) is made available in several different representations coded at different bit rates and/or quality levels so that video clients can choose representations according to bandwidth availability, device capabilities, etc.

FIGS. 1 to 3 illustrate three different VoD approaches generally denoted simulcast (FIG. 1), transcoding (FIG. 2) and guided transcoding (FIG. 3). In the simulcast approach, the original video is encoded at different bit rates and/or quality levels, represented as high quality (HQ) and various different low quality (LQ) versions in the figures, and the resulting HQ and LQ versions of the video are stored on a server. Accordingly, a video of a given bit rate and/or quality level can be retrieved from the server and sent to the client upon request. Simulcast results in a low server complexity since all desired bit rates and/or quality levels of the original video are encoded and stored before the actual request. Once the request arrives, the server can just select the requested representation of the video and transmit it without any further computations. A problem with the simulcast approach is that it requires a large storage capacity.

The transcoding approach shown in FIG. 2 aims to reduce the storage demands compared to simulcast as much as possible. Accordingly, only the highest bit rate and/or quality level is encoded and stored. When a request is received from a client and the request is for a LQ version of the video, the server transcodes HQ representation of the video to produce a LQ version. Typically, the server will decode the HQ version, downsize it to the requested resolution, and then encode the LQ version using the downsized HQ version. Downsampling is not done when the requested video is of the same resolution as the HQ stream. The transcoding approach allows the server to save much of the storage capacity that the simulcast approach requires at the cost of increased computational complexity. This high computational complexity is a main disadvantage of the transcoding approach.

Guided transcoding, which is illustrated in in FIG. 3, is a compromise between the simulcast and transcoding approaches. The guided transcoding approach aims to reduce both the computational complexity of encoding on demand the LQ versions of the video and the storage requirements of storing all HQ and LQ versions of the video. The initial encoding part of guided transcoding is similar to simulcast encoding. However, in clear contrast to the simulcast approach, not all data is stored for the LQ versions of the video. Only the so-called side information (SI) is stored for these LQ versions, in which the actual video data in terms of residual data and transform coefficients is removed from the LQ bit streams. The SI contains inter motion information, intra mode information and information of how the pictures are dived into transform blocks, etc. Deriving this information is computationally the most expensive and time-consuming parts of the encoding process. However, as residual data and transform coefficients are not retained, the required storage space is much smaller compared to the simulcast approach. Furthermore, by using the pre-generated SI when receiving a request for a LQ version of the video, the transcoding process is much faster since the data that is most computationally expensive to generate is already present in the SI.

The above transcoding techniques do not satisfy the combination of storage reductions and low computational overhead demanded by industry (e.g., VoD service providers).

Thus, there is a need to improve transcoding solutions by reducing the required storage capacity and/or computational complexity.

SUMMARY

An object of embodiments herein is to provide an improved solution for transcoding.

According to a first aspect there is presented a method for decoding of coded delta transform coefficients. The method comprises deriving a predicted residual block. The method comprises transforming the predicted residual block using a forward transform, thereby producing a plurality of original estimated coefficients (OECs), the plurality of OECs comprising a first OEC. The method comprises quantizing the plurality of OECs, thereby producing a plurality of quantized estimated transform coefficients (ETCs) comprising a first ETC corresponding to the first OEC. The method comprises selecting a category based on the first OEC. The method comprises decoding a first coded delta transform coefficient (DTC) corresponding to the first OEC, thereby producing a first decoded DTC, wherein the decoding comprises using the selected category to decode the first coded DTC. The method comprises computing a first original transform coefficient by adding the first decoded DTC to the first ETC.

According to a second aspect there is presented a method for encoding delta transform coefficients (DTCs). The method comprises deriving predicted residual block. The method comprises transforming the predicted residual block using a forward transform, thereby producing a plurality of original estimated coefficients (OECs) including a first OEC. The method comprises quantizing the plurality of OECs, thereby producing a plurality of quantized estimated transform coefficients (ETCs) comprising a first ETC. The method comprises selecting a category based on the first OEC. The method comprises calculating a first DTC by subtracting the first ETC from a first original transform coefficient (QC). The method comprises encoding the first DTC, thereby producing a first encoded DTC, wherein the encoding comprises using the selected category to encode the first DTC.

According to a third aspect there is provided an apparatus adapted to perform the method for decoding according to the first aspect.

According to a fourth aspect there is provided a decoder comprising the apparatus according to the third aspect.

According to a fifth aspect there is provided a decoder for producing original transform coefficients. The decoder comprises a predicted residual block deriving (PRBD) unit for deriving a predicted residual block. The decoder comprises a transforming unit for transforming the predicted residual block using a forward transform, thereby producing a plurality of original estimated coefficients (OECs), the plurality of OECs comprising a first OEC. The decoder comprises a quantizing unit for quantizing the plurality of OECs, thereby producing a plurality of quantized estimated transform coefficients (ETCs) comprising a first ETC corresponding to the first OEC. The decoder comprises a category selector for selecting a category based on the first OEC. The decoder comprises a delta transform coefficient decoding unit for decoding a first coded delta transform coefficient (DTC) corresponding to the first OEC, thereby producing a first decoded DTC, wherein the decoding comprises using the selected category to decode the first coded DTC. The decoder comprises a computing unit for computing a first original transform coefficient by adding the first decoded DTC to the first ETC.

According to a sixth aspect there is provided an apparatus adapted to perform the method for encoding according to the second aspect.

According to a seventh aspect there is provided an encoder comprising the apparatus according to the sixth aspect.

According to an eighth aspect there is provided an encoder for producing coded delta transform coefficients (DTCs). The encoder comprises a predicted residual block deriving (PRDB) unit for deriving a predicted residual block. The encoder comprises a transforming unit for transforming the predicted residual block using a forward transform, thereby producing a plurality of original estimated coefficients (OECs), the plurality of OECs comprising a first OEC. The encoder comprises a quantizing unit for quantizing the plurality of OECs, thereby producing a plurality of quantized estimated transform coefficients (ETCs) comprising a first ETC corresponding to the first OEC. The encoder comprises a category selector for selecting a category based on the first OEC. The encoder comprises a calculating unit for calculating a first DTC by subtracting the first ETC from a first original transform coefficient (QC). The encoder comprises a DTC encoding unit for encoding the first DTC, thereby producing a first encoded DTC, wherein the encoding comprises using the selected category to encode the first DTC.

According to a ninth aspect there is provided a computer program comprising instructions which when executed by processing circuitry causes the processing circuitry to carry out the method according to any of the first to the eighth aspect described above.

According to a tenth aspect there is provided a carrier comprising a computer program according to the ninth aspect, wherein said carrier is one of an electronic signal, an optical signal, an electromagnetic signal, a magnetic signal, an electric signal, a radio signal, a microwave signal, or a non-transitory computer-readable storage medium.

Certain aspects of the present disclosure and their embodiments may provide solutions to these or other challenges. Embodiments employ a variant of guided transcoding, denoted deflation/inflation. Embodiments take advantage of the way estimated coefficients are computed in the deflation and inflation schemes and uses additional information to code and decode delta transform coefficients (DTCs) in a more efficient way. This additional information includes categories derived from original estimated coefficients (OECs). Using these categories allows a strong increase in encoding efficiency.

For example, this disclosure describes three different procedures, each of which uses the derived categories to produce an encoding efficiency. The first procedure is denoted the "sign guess" procedure, which includes predicting a sign for each coefficient and uses, for example, context-adaptive binary arithmetic coding (CABAC) to signal whether the predictions are correct. The second procedure is denoted "remapping," which reorders coefficients based on their likelihood to be non-zero. The third procedure is denoted "context selection," which selects contexts based on a combination of their likelihood of being non-zero, transform block size, position and channel type.

Embodiments described herein, alone and/or in combination, significantly reduce the storage capacity required for the SI while still allowing a bit-exact recreation of the initial LQ bit stream. Tests have shown a reduction in the required storage capacity of nearly 30 percent. Moreover, the additional computational complexity required is very small.

BRIEF DESCRIPTION OF THE DRAWINGS

The accompanying drawings, which are incorporated herein and form part of the specification, illustrate various embodiments.

FIGS. 7A to 7F illustrate a remapping process according to an embodiment.

DETAILED DESCRIPTION

Figure 1:
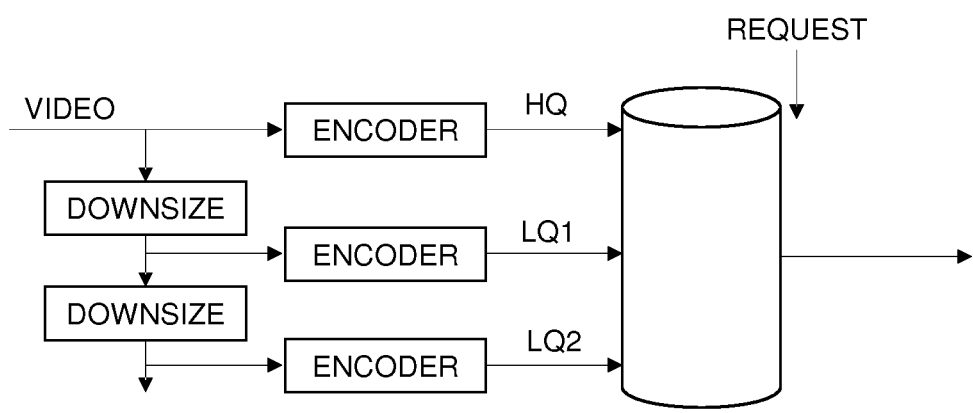
FIG. 1 is a schematic representation of the simulcast approach as known in the art.
Figure 2:
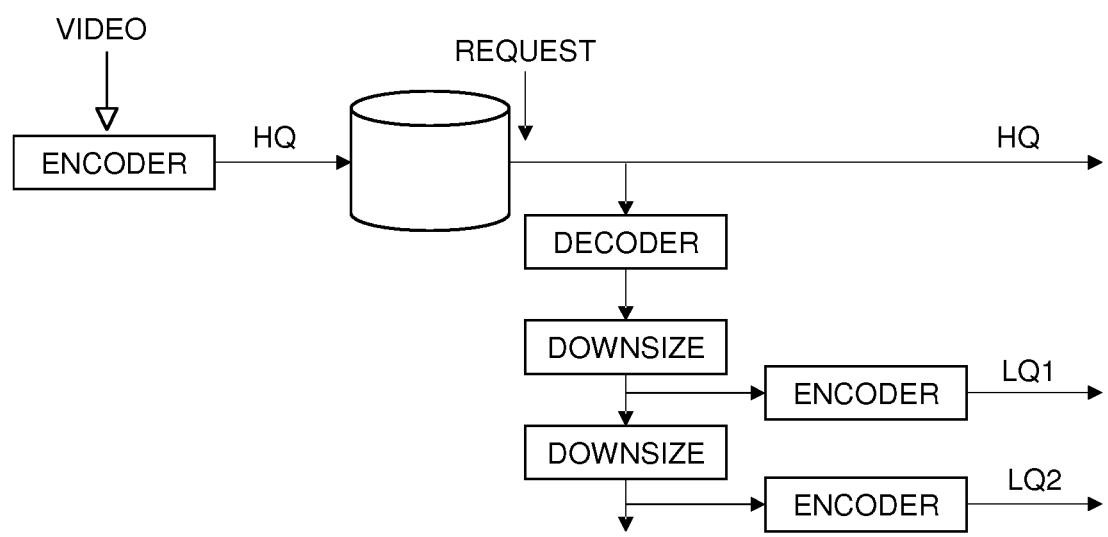
FIG. 2 is a schematic representation of the transcoding approach as known in the art.
Figure 3:
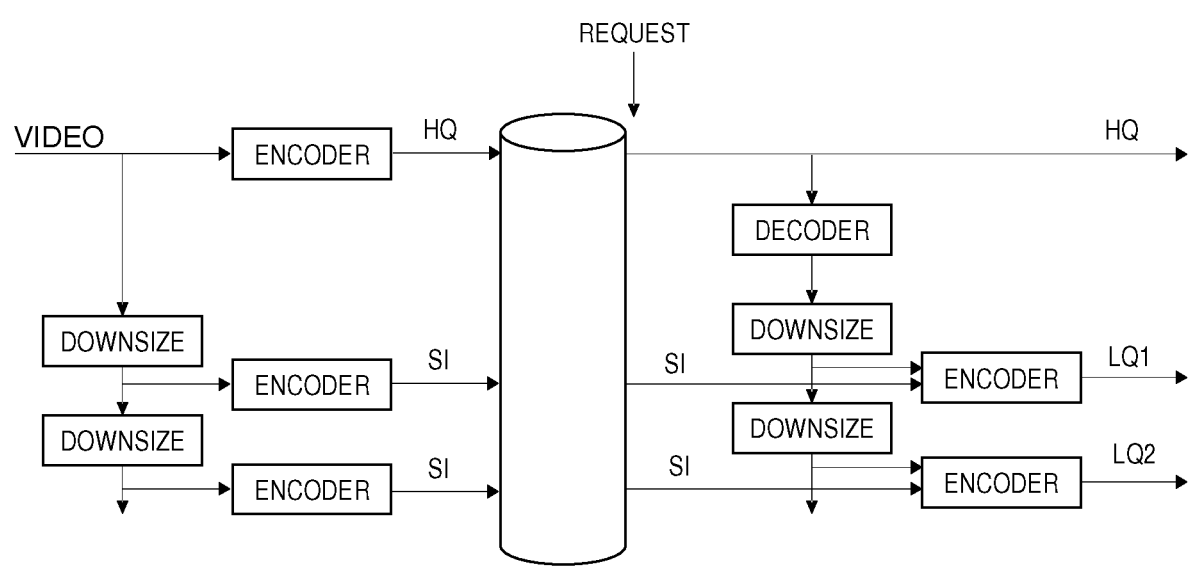
FIG. 3 is a schematic representation of the guided transcoding approach as known in the art.
Figure 4A:
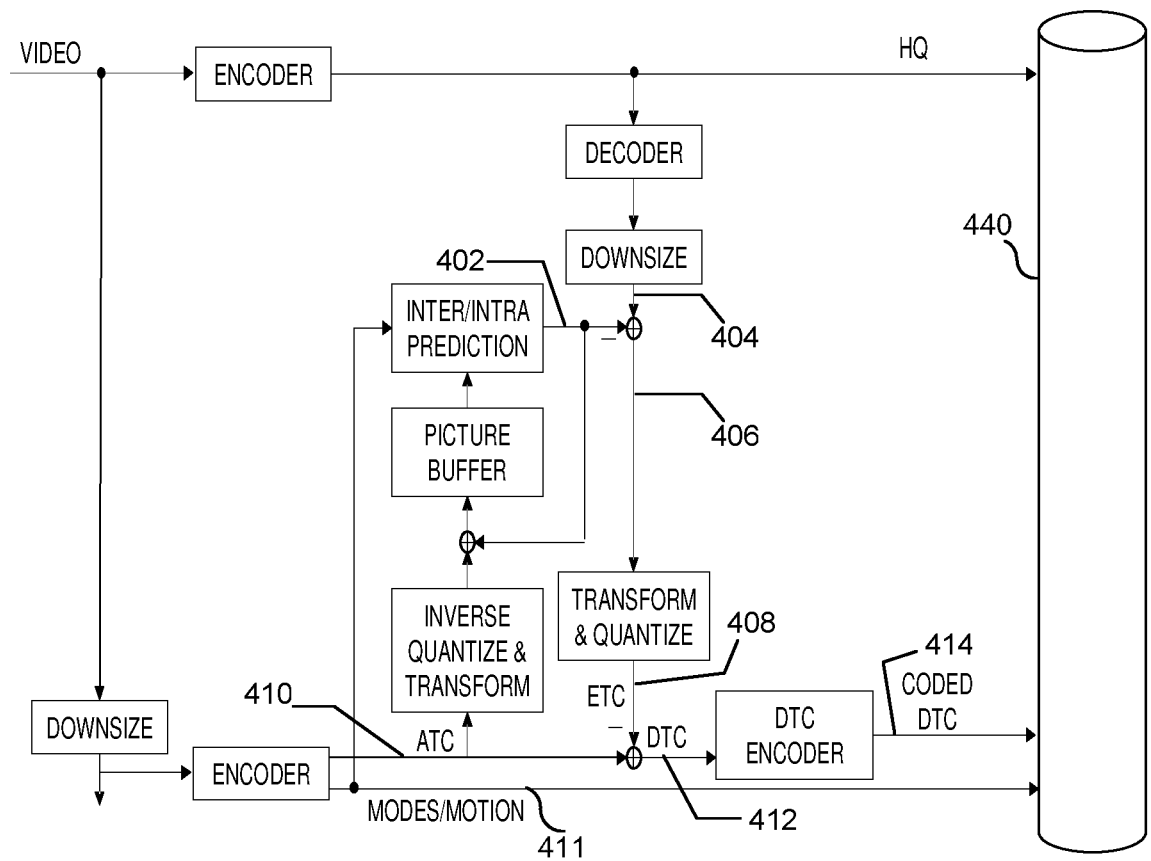
FIG. 4A is a schematic representation of a deflation process for use in a guided transcoding approach according to an embodiment.
Figure 4B:
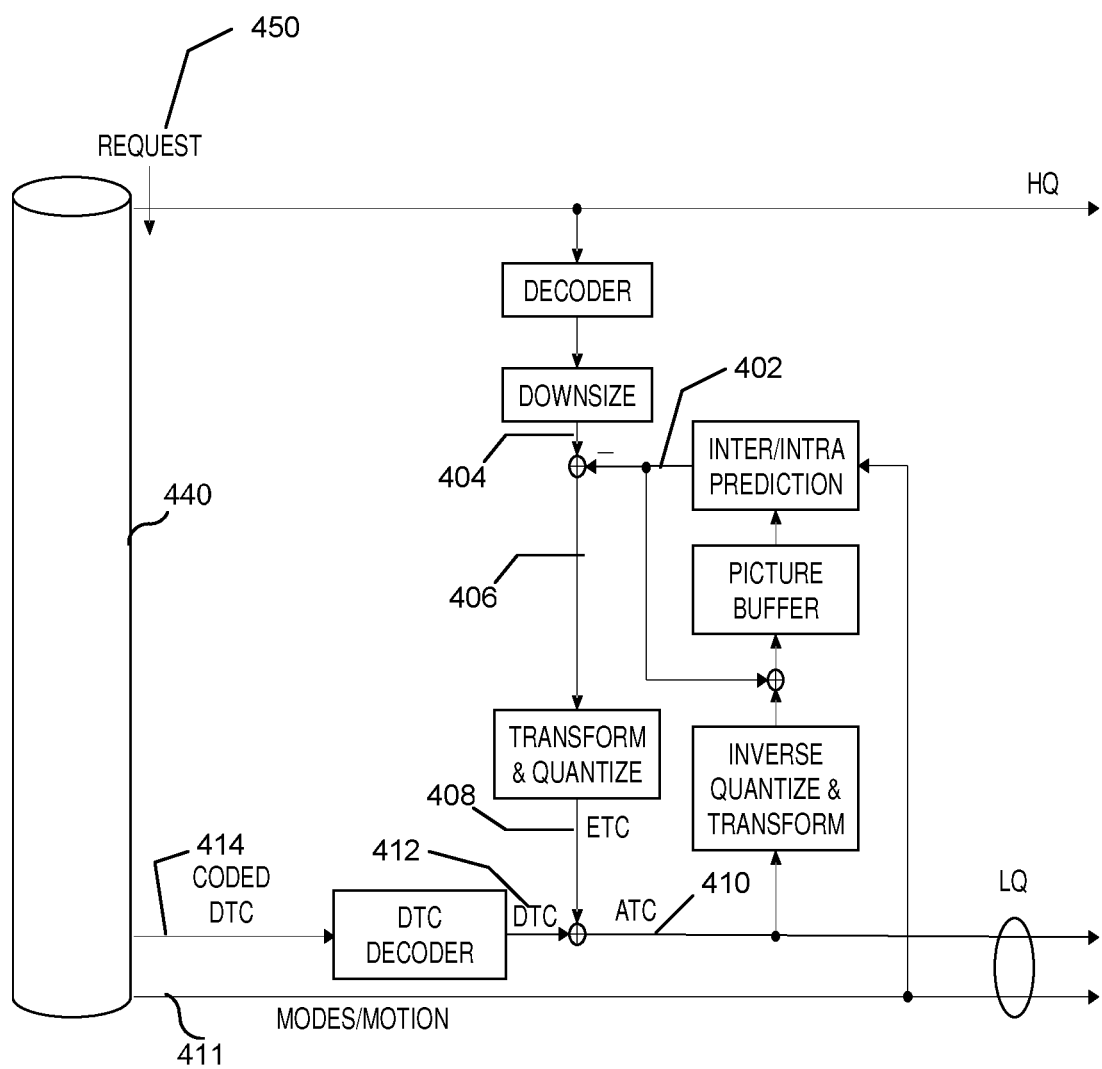
FIG. 4B is a schematic representation of an inflation process for use in a guided transcoding approach according to an embodiment.

A variant of guided transcoding, denoted deflation/inflation, is illustrated in FIG. 4A (deflation) and FIG. 4B (inflation) and described in reference [1]. During deflation, which is the step of preparing the SI data, as shown in FIG. 4A, the intra mode information and inter motion information from a LQ bit stream is used to obtain an inter/intra prediction 402, which is used together with a downsized reconstruction of the HQ bit stream 404 to calculate a matrix (or "block") of residuals 406. The residual block 406 is subjected to a forward transformation and is then quantized to form a block of quantized estimated transform coefficients (ETCs) 408. These are then subtracted from the block of original transform coefficients (ATCs) 410, which are parsed from the LQ bit stream. This results in a block of delta transform coefficients (DTCs) 412, which are encoded into coded delta transform coefficients (C-DTCs) 414 and stored in storage 440 together with the modes and motion information 411 until requested. To summarize, the deflation process uses the decoded HQ stream for prediction to convert original transform coefficients (ATCs) in an input LQ stream to coded delta transform coefficients (C-DTCs) in an output SI stream.

After a request 450 for an LQ version of the video is received, the transcoding step to generate an LQ stream from the HQ stream and the SI stored in storage 440 (denoted inflation (see FIG. 4B)), is executed. Here the SI is obtained from storage 440 and the coded delta transform coefficients (C-DTC) 414 are obtained from the SI. The modes and motion information 411 from the SI is used to obtain the prediction 402, which is used together with the downsized reconstruction of the HQ bit stream 404 to calculate the residual block 406. This residual block 406 is forward transformed and quantized to determine the block of estimated transform coefficients (ETCs) 408. By adding the ETCs 408 and the delta transform coefficients (DTCs) 412 output from the decoder, the original transform coefficients (ATCs) 410 from the original encoding can be created. These ATCs 410 are transmitted together with the modes and motion information 411 in a single bit stream to the client requesting the video. This bit stream is bit exact compared to the output of the original encoding of the LQ representation. This means that there is no loss in compression efficiency by using inflation/deflation transcoding compared to simulcast.

Figure 5A:
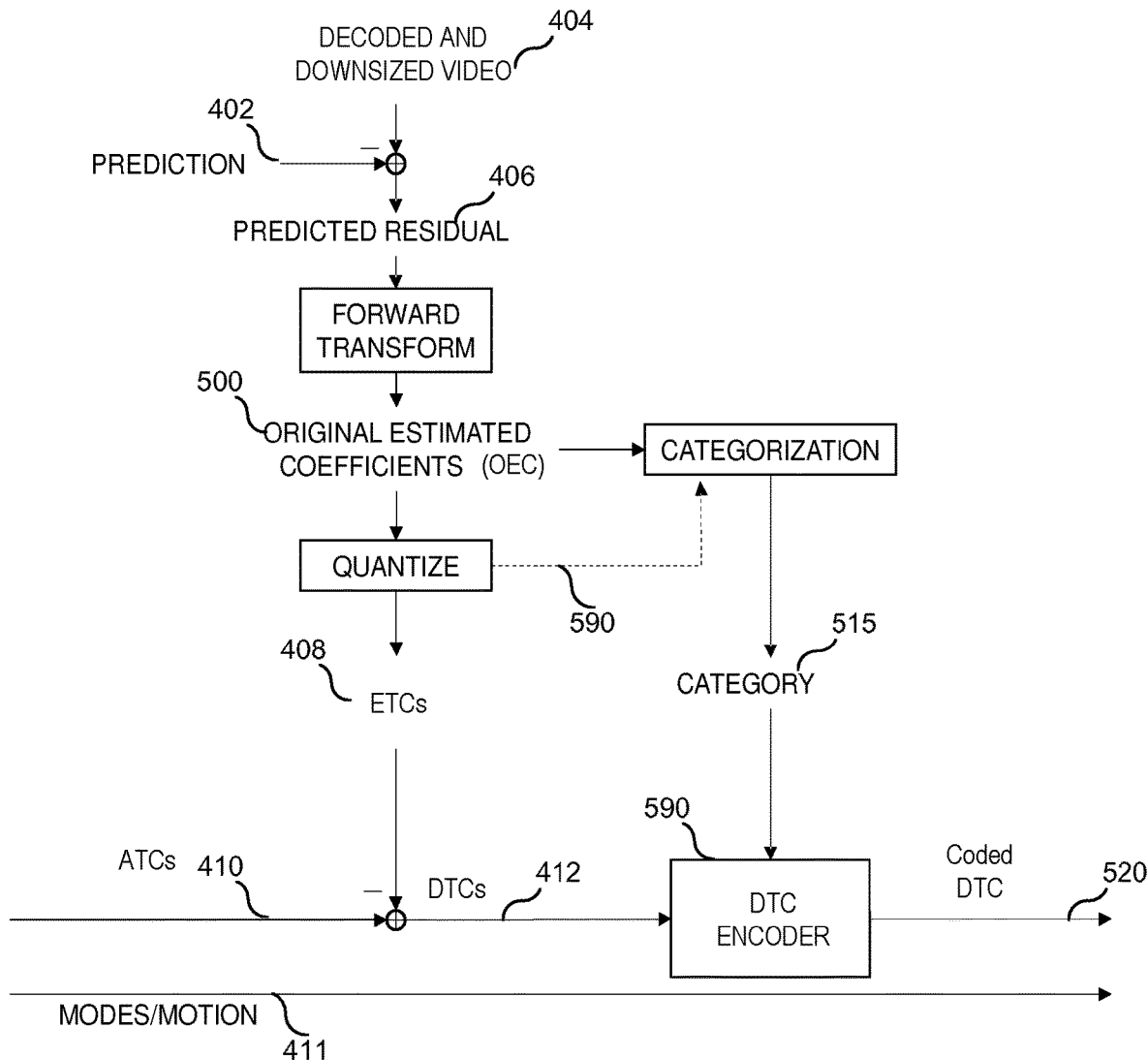
FIG. 5A is a schematic representation of a deflation process for use in a guided transcoding approach according to an embodiment.

FIG. 5A shows an improved version of the deflation process shown in FIG. 4A. First the prediction 402, which is produced by the inter/intra prediction module shown in FIG. 4A, is subtracted from the decoded and downsized video 404. The difference is the residual block 406, which is then subjected to a forward transformation, resulting in a block of original estimated coefficients 500. These are quantized to determine the corresponding block of quantized estimated transform coefficients (ETCs) 408. The ETCs 408 are then subtracted from the ATCs 410, which stem from the original LQ encoding as shown in FIG. 4A. In some embodiment, a selected category 515 is assigned to each block position (see block 704 in FIG. 7 for an example). The particular category 515 assigned to a block position is selected based on the value of the original estimated coefficient 500 that is located in the same position. For example, the category assigned to block position 0 is selected based on the value of the original estimated coefficient 500 that is located in block position 0. In some embodiments, which category gets selected is based not only on the value of the original estimated coefficient, but also quantization information 590. The categories 515 are then used by DTC encoder 590 to encode the DTCs 412 into coded DTCs (C-DTCs) 520. The C-DTCs 520 is stored in storage 440 together with modes and motion information 411.

Figure 5B:
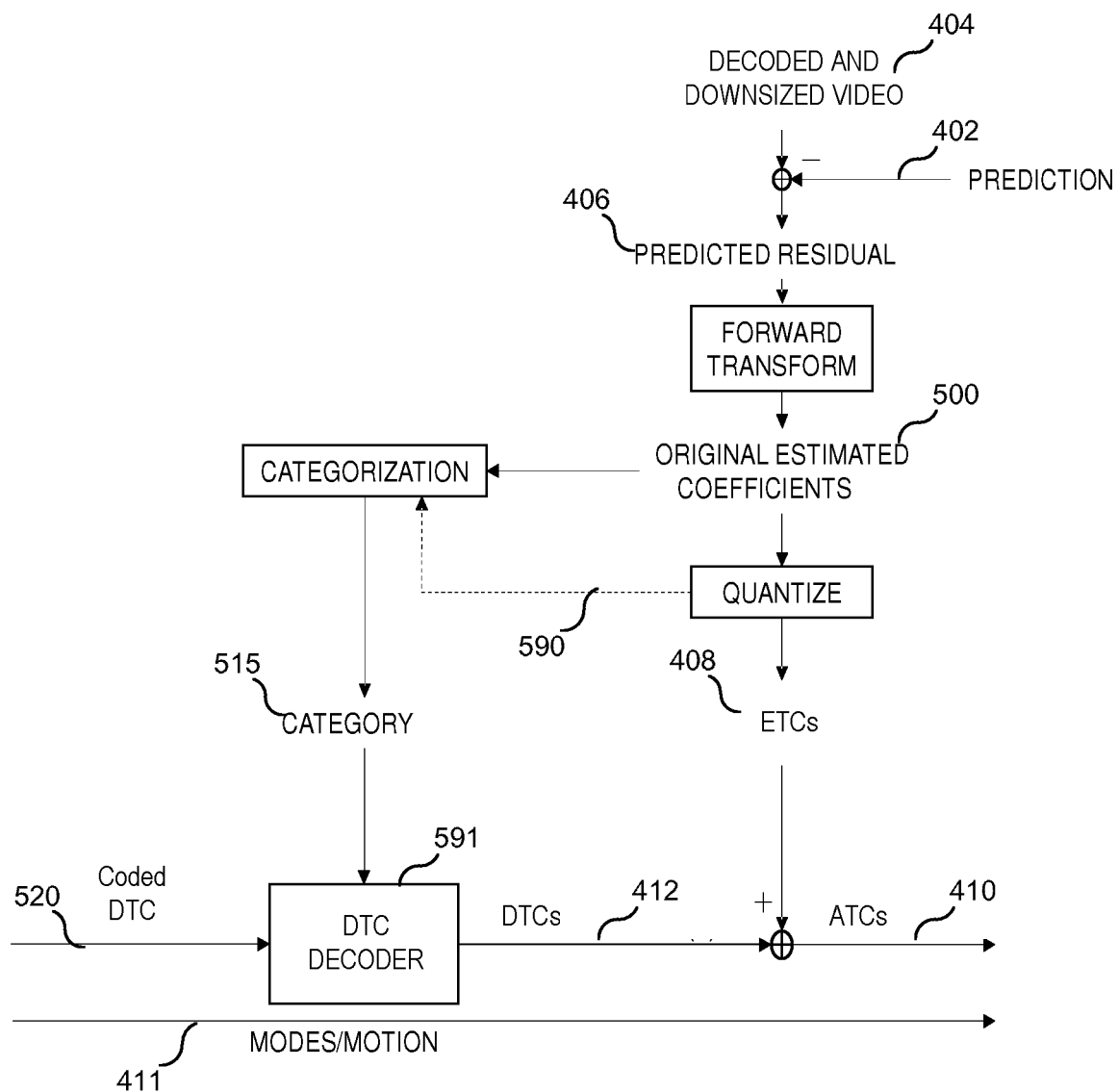
FIG. 5B is a schematic representation of an inflation process for use in a guided transcoding approach according to an embodiment.

FIG. 5B shows an improved version of the inflation process shown in FIG. 4B. First the prediction 402, which is produced by the inter/intra prediction module shown in FIG. 4B, is subtracted from the decoded and downsized video 404. The difference is the residual block 406, which is then subjected to a forward transformation, resulting in the block of original estimated coefficients 500. These are quantized to determine the corresponding block of ETCs 408. In some embodiment, a selected category 515 is assigned to each block position (see e.g., block 704 in FIG. 7 for an example). The particular category 515 assigned to a block position is selected based on the value of the original estimated coefficient 500 that is located in the same position (the selection may also be based on the quantization information 590). For example, the category assigned to block position 0 is selected based on the value of the original estimated coefficient 500 that is located in block position 0. The categories 515 are then used by DTC decoder 591 to decode the coded DTCs 520 into the DTCs 412. After decoding, the DTCs 412 are added to the ETCs 408. By adding the ETCs 408 and the DTCs 412 output from decoder 591, ATCs 410 from the original encoding can be created. These ATCs 410 are transmitted together with the modes and motion information 411 in a single bit stream to the client requesting the video.

In FIG. 4A, 4B, 5A, 5B downsizing is performed only if the target resolution is lower than the resolution of the HQ version of the video. Accordingly, if the target resolution is identical to the HQ version of the video, the downsizing operation shown in the figures is just a pass-through of the video data.

Categorization

The categorization process includes assigning a category value (e.g., a category id) to each coefficient position in a block (e.g., a 4×4 block contains 16 coefficients and each coefficient occupies one of the sixteen block positions). The category values may be a number with a certain precision such that there may be as many categories as there are coefficients in the block, but it is preferable to use fewer categories than there are coefficients in the block.

The category to assign to a position in a block is based on the value of the original estimated coefficient 500 in the same position. That is, the original estimated coefficients 500 are arranged in a block such that each original estimated coefficient has a unique position in the block. The categorization is done such that the categories represent different amounts of quantization error. For instance, an original estimated coefficient (OEC) value may be the result of applying a forward transform and the OEC value may have high precision. The OEC value is then quantized into an ETC value which is used as a coefficient predictor. The ETC value has much lower precision than the OEC value so some information is lost during quantization. In a video codec, there is a de-quantization process that reconstructs quantized coefficients into reconstructed coefficients, and by applying de-quantization to the ETC value, one can derive a reconstructed estimated coefficient (REC) value. The difference between the OEC value and the REC value can be denoted as the quantization error value of the estimated coefficient (QEE). Both the process of encoding and decoding delta transform coefficients (DTCs) (FIG. 5B and FIG. 5A) calculates the OEC value identically and can therefore make use of knowing the amount of precision loss or the value or magnitude of the quantization error.

One preferred method of categorization is to let the categories reflect the QEE value. For example, assume that we use a so-called quantization parameter (QP) value of 5 and that quantization is done by ETC=round(OEC/QP) where round(x) is returning the integer value such that abs(x-round(x)) is minimized. Assume that the inverse quantization process is REC=ETC*QP. For a set of different OEC we get the table below:

TABLE 1

| OEC | 10 | 11 | 12 | 13 | 14 | 15 | 16 | 17 | 18 | 19 | 20 |
|---|---|---|---|---|---|---|---|---|---|---|---|
| ETC | 2 | 2 | 2 | 3 | 3 | 3 | 3 | 3 | 4 | 4 | 4 |
| REC | 10 | 10 | 10 | 15 | 15 | 15 | 15 | 15 | 20 | 20 | 20 |
| QEE | 0 | 1 | 2 | -2 | -1 | 0 | 1 | 2 | -2 | -1 | 0 |

From the table above we can see that OEC values between 13 and 17 all result in an ETC value of 3 and a REC value of 15. It seems more likely that an ETC value of 3 that comes from an OEC value of 15 is a more reliable coefficient predictor than if it came from an OEC value of 13 or 17. It may be more likely for an ETC value with a low absolute QEE value to be a good predictor than an ETC value with a high absolute QEE value. Therefore, it may be more likely that a coefficient with a low absolute QEE value results in a low or zero delta transform coefficient value and this property can be exploited by categorization to encode the DTCs more efficiently. One way of categorization is to categorize such that OECs with similar absolute QEE values are put into the same category.

From Table 1 we also see that the sign of the QEE values may differ. Assuming that the OEC is a good predictor most DTC relative to the ETC values would be zero. But for the non-zero ETC values, the sign of the ETC value may be highly correlated with the sign of the corresponding QEE value. If the ETC value is equal to 3, the OEC value is equal to 17, and we know that there is a corresponding non-zero delta transform coefficient, then it seems more likely that the sign of the delta transform coefficient is positive rather than negative. This property can be exploited by categorization to encode the signs of the DTCs more efficiently. One way of categorization is to categorize such that coefficients with positive corresponding QEE values are put in one category and coefficients with negative corresponding QEE values are put in another category. The sign of the actual non-zero DTCs can then be handled either by encoding the signs differently depending on the category they belong to, or by predicting the sign of the non-zero delta transform coefficient with a defined predictor for each category.

The quantization function ETC=round(OEC/QP) and the inverse quantization function REC=ETC*QP are both simplistic examples. A real-world video codec system is expected to use more complex functions and the functions may differ between codec systems or between video codecs. The categorization should be based on the actual quantization process that is used. The quantization process may here include both the quantization function and the inverse quantization function.

Figure 6:
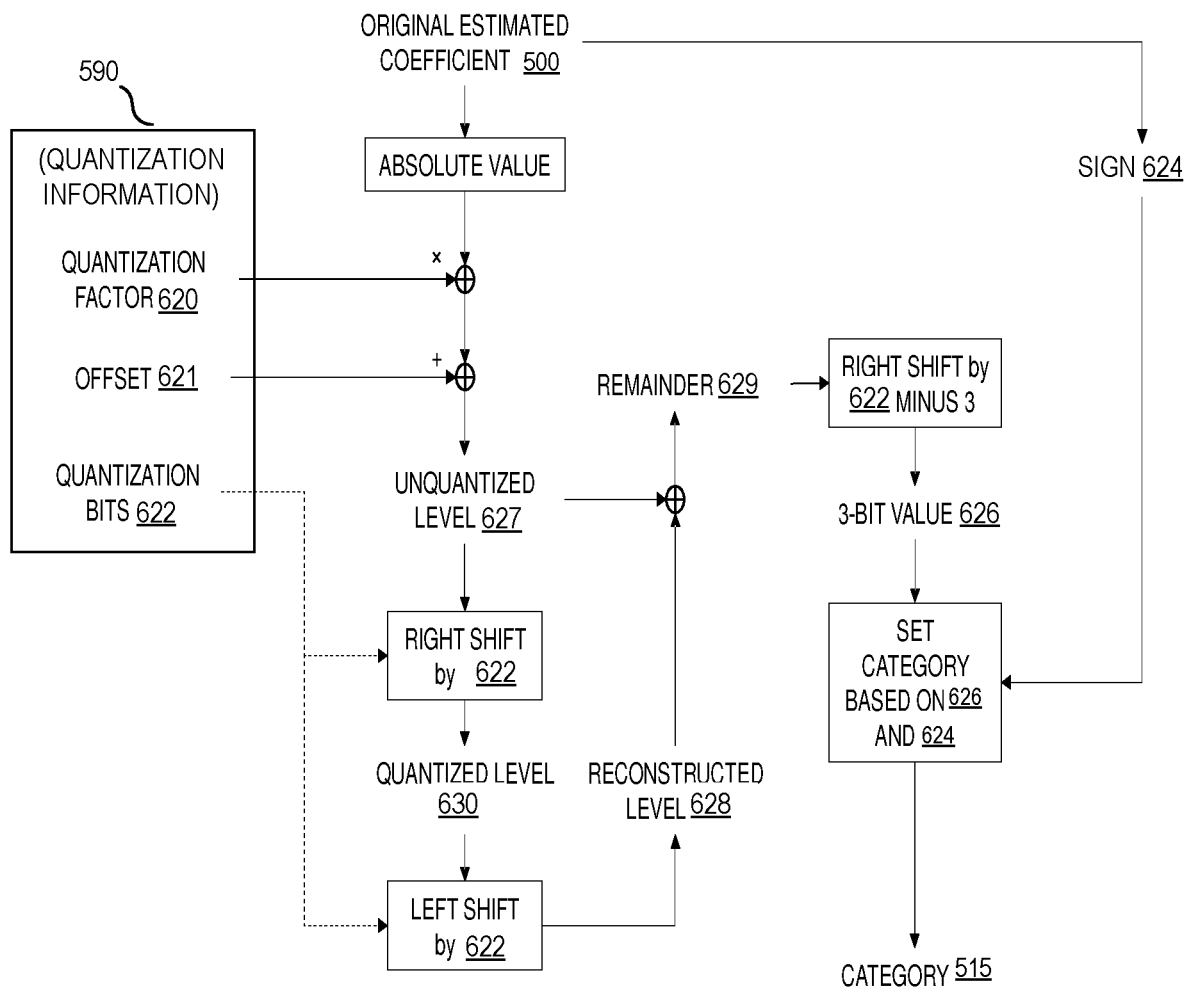
FIG. 6 is a schematic representation illustrating a process for selecting categories according to an embodiment.

An example categorization process, according to one embodiment, is illustrated by FIG. 6. A category is selected for each position inside a block (i.e., each block position) (e.g., a 4×4 block has 16 positions and an 8×8 block has 64 positions). First the sign 624 of the original estimated coefficient 500 is extracted and stored. The absolute value of the original estimated coefficient 500 is then multiplied with a quantization factor (QF) 620, which depends on the quantization parameter (QP). An offset 621, which, like the quantization factor 620, stems from the quantization process, is added to the result of the multiplication, resulting in an unquantized level 627. The unquantized level 627 is then first right shifted by the number of quantization bits 622 to determine a quantized level 630, and then left shifted by the same number of bits. The result is a reconstructed level 628. In the next step, the reconstructed level 628 is subtracted from the unquantized level 627, leaving the remainder 629 of the quantization. The remainder 629 is then right shifted by the number of quantization bits 622 minus 3, leaving only the three highest bits of the remainder 629 as a 3-bit value 626. This 3-bit value 626 holds information on how much an original estimated coefficient 500 and its reconstructed/decoded coefficient value differ. Afterwards, the 3-bit value 626 is evaluated. If it has the values 0 or 7, the position is assigned category 1. In case of the 3-bit value 626 being 1 or 6, the assigned category is 2. In the remaining cases, so where the 3-bit value 626 is at least 2 and at most 5, the position is assigned category 3. Furthermore, if the 3-bit value 626 is 3 or less, the category is marked as negative, so -1, -2 or -3, respectively. Finally, if the sign 624 of the original estimated coefficient is negative, the sign of the category is switched. How the categories are assigned is visualized in table 2 below.

TABLE 2

Mapping between 3-bit value, sign, and category

| 3-bit value 626) | Sign 624) | Category |
|---|---|---|
| 0 | + | -1 |
| 0 | - | +1 |
| 1 | + | -2 |
| 1 | - | +2 |
| 2 or 3 | + | -3 |
| 2 or 3 | - | +3 |
| 4 or 5 | + | +3 |
| 4 or 5 | - | -3 |
| 6 | + | +2 |
| 6 | - | -2 |

TABLE 2-continued

Mapping between 3-bit value, sign, and category

| 3-bit value 626) | Sign 624) | Category |
|---|---|---|
| 7 | + | +1 |
| 7 | − | −1 |

Sign Guess

The "sign guess" procedure (a.k.a., "sign guess tool") uses the category for each coefficient to predict the sign of the delta transform coefficient (DTC). In the HEVC standard the coefficient signs are signaled using flags which are bypass-coded. Bypass-coded here means that the arithmetic coder is using an equal probability to code a flag, which results in a bit cost very close to 1 bit to code each flag regardless of the value of the flag. With the proposed sign guess tool, instead of using bypass-coded flags for indicating the signs of coefficients, the flags are instead signaling whether or not to use a predicted sign for each coefficient. The proposed flags may be CABAC-coded using two different contexts.

The prediction can be done such that expected corresponding QEE values having one sign is put in separate categories and expected corresponding QEE values having the other sign is put in separate categories. A predicted sign (positive or negative) has been set for each category. A coefficient or delta coefficient may be derived by the following steps: 1) determine the category of the coefficient based on the corresponding original estimated coefficient; 2) derive the predicted sign for the coefficient by retrieving the predicted sign for the category; 3) decode a flag from the bitstream, which flag specifies whether the sign of the coefficient is equal to the predicted sign or not; 4) decode the absolute value of the coefficient; and 5) if the flag specifies that the sign of the coefficient is equal to the predicted sign, then the value of the decoded coefficient is set to the absolute value of the coefficient having the sign equal to the predicted sign (i.e., the value of the coefficient is set equal to the absolute value times −1 if the predicted sign is negative or the value of the coefficient is set equal to the absolute value times +1 if the predicted sign is positive), otherwise, the value of the decoded coefficient is set to the absolute value of the coefficient having the opposite of the predicted sign (i.e., the value of the coefficient is set equal to the absolute value times +1 if the predicted sign is negative or the value of the coefficient is set equal to the absolute value times −1 if the predicted sign is positive).

In the example of FIG. 6, the predicted sign is the sign of the category. One CABAC context is used for all cases where the category has an absolute value of 1 or 2, and a second context is used for cases where the category has an absolute value of 3. During inflation (FIG. 5B), if the flag is decoded as '1', the sign of the category 515 will be used for the decoded delta transform coefficient 412. If the decoded value of the flag is '0', the sign of the decoded delta transform coefficient 412 will be the opposite of the sign the category 515 has. During deflation (FIG. 5A), the sign of the delta transform coefficient 412 is compared with the sign of the category 515. If they are identical, the flag is encoded as '1', otherwise as '0'.

Remapping

Coded coefficients of a block are generally coded in a specific order, referred to as the "scan" order. The scan order is designed such that it is likely that larger absolute coefficients are early in the scan and smaller absolute coefficients and zero coefficients are last in the scan. The proposed remapping mechanism utilizes knowledge of the OEC values and information from the quantization process such that coefficients with larger expected absolute QEE values are put earlier in the scan. It is preferable to use categories to "remap" the coefficients before the coefficients are scanned. In one embodiment, the coefficients are remapped by repositioning the coefficients in the block based on the categories associated with the coefficients and not changing the scan order. In another embodiment, the coefficients are remapped by merely changing the scan order based on the categories.

In one embodiment, the order in which the coefficients are scanned is based on the absolute value of the OEC values and the absolute value of the expected QEE value such that the coefficients are scanned in the order of f(OEC, QEE), where the function f( ) returns a larger value if the absolute value of OEC is larger and f( ) returns a larger value if the absolute value of the QEE is larger.

Figure 7:
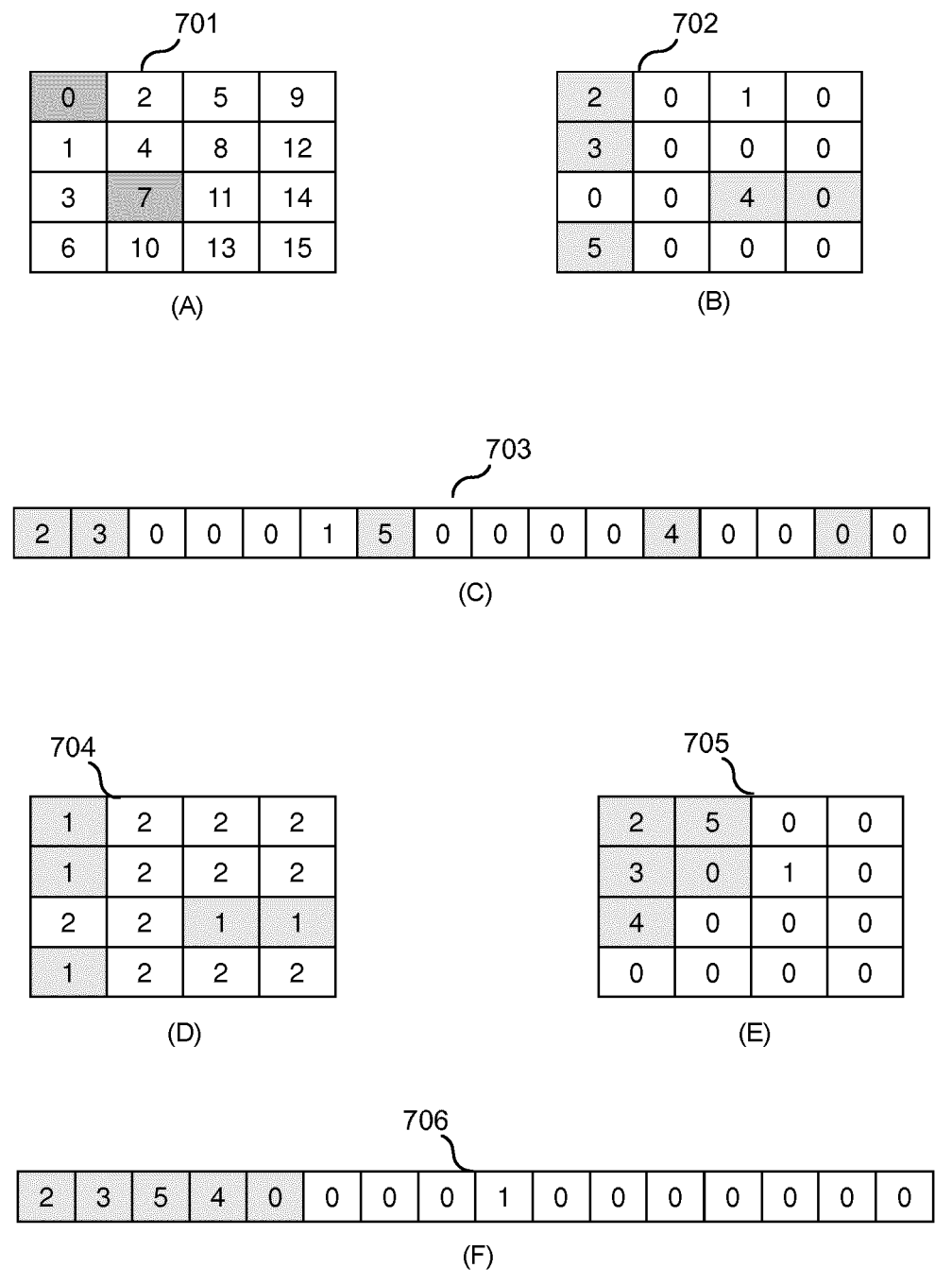

FIG. 7 illustrates an example of a remapping procedure, which changes the order in which DTCs are scanned. FIG. 7 shows a diagonal scanning order in a 4×4 transform block 701 and an example block 702 containing example delta transform coefficients. Scanning the block 702 with the given scanning order shown in block 701 results in coefficients being processed in the order shown left-to-right as shown by the 1×16 block 703. Processing here may mean delta transform coefficient decoding or delta transform coefficient encoding. The processing would be stopped at the coefficient with the value '4', which is in position 11 since after that position all coefficients are equal to zero. The grey marked positions in 702 are all positions which have been assigned to category 1 in this example. The categories for the coefficient positions in block 702 are shown in block 704.

The example remapping process includes re-positioning coefficients based on the category information 704. In this example, two rounds of re-positioning are performed. In the first round, all of the coefficients associated with category 1 (i.e., the shaded coefficients in block 702) are moved to the first N positions of the block in scanning order, where N is equal to the number of the coefficients associated with category 1 (in this example N=5). Hence, the five grey marked coefficients from 702 are moved to the first five positions of the remapped transform block 705 in scanning order. In the second round, all coefficients associated with category 2 (i.e., the unshaded coefficients in block 702) are re-positioned to follow the category 1 coefficients in the remapped transform block 705. This is also done in scanning order, first mapping to positions close to the start of the scan and continuing with positions in scan order. The result of remapping the transform block 702 and the categories 704 is shown in 705.

Figure 8A:
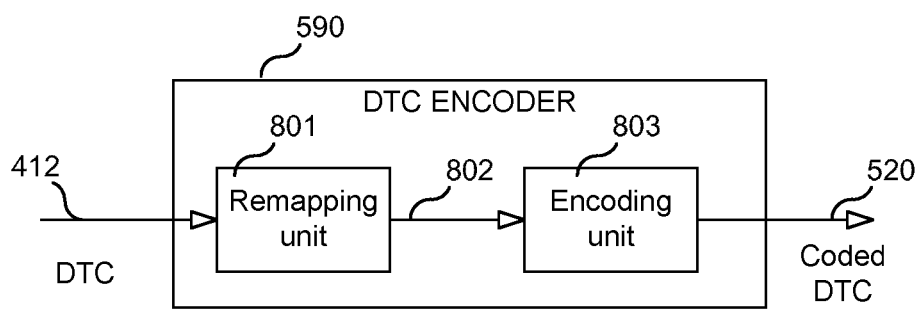
FIG. 8A illustrates a DTC encoder according to an embodiment.

Scanning the remapped block 705 with the given scanning order shown in block 701 results in coefficients being processed in the order shown left-to-right in the 1×16 block 706. This means that the coded delta transform coefficients will be processed in an order that is determined by the categories. In the example, the delta transform coefficients associated with category 1 will be processed before the delta transform coefficients associated with category 2. Processing here may mean delta transform coefficient decoding or delta transform coefficient encoding. Here the encoding/decoding would be stopped at position 8, and thus closer to the beginning of the scan compared to position 11 before remapping. The non-zero coefficient values in block 706 are less spread out compared to block 703, with a higher number of trailing zero coefficients, which makes the coefficients in block 706 codable using fewer bits than the coefficients in block 703. The remapping process described here describes a tool that can be used in the deflation process as shown in FIG. 5A to re-arrange the delta transform coefficients 412 as a first step before delta transform coefficient encoding. If the tool is used, further processing steps of the delta transform coefficient encoder uses the remapped transform block instead of the transform block. This is illustrated in FIG. 8A, which shows that in some embodiments DTC encoder 590 includes a remapping unit 801 that receives a block of DTCs 412, remaps the block to produce a re-mapped block 802. An encoding unit 803 of encoder 590 then performs the encoding using the re-mapped block 802 to produce the coded block of DTCs 520.

The remapping process described here is reversible and a reverse mapping process can be used in the inflation process (FIG. 5B) to re-arrange decoded delta transform coefficients as a last step of the delta transform coefficient decoder 591. In this case, the decoder will first decide the categories for each coefficient position and decode the coded delta transform coefficients in the order shown in block 706. The decoding order is done in a category order such that coefficients of one category are decoded before coefficients of another category. After the coefficients are decoded they can be seen as shown block 705. Using the derived categories for each coefficient position as shown in block 704, the decoder uses two rounds of re-positioning. In the first round, the five first gray coefficients from the left in 706 are moved to the first positions in scan order having category 1. This means that the grey positions in block 702 get allocated with coefficient values. In a second round of scanning, the remaining white coefficients in block 706 are moved to the remaining positions in scan order having category 2. This means that the white positions in block 702 get allocated with coefficient values.

Figure 8B:
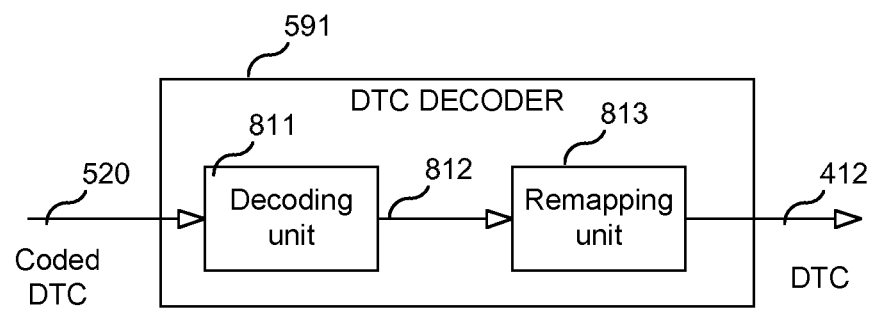
FIG. 8B illustrates a DTC decoder according to an embodiment.

FIG. 8B illustrates DTC decoder 591 according to some embodiments. DTC decoder 591 may include a decoding unit 811 that receives C-DTCs 520 to produce decoded DTCs 812. The decoded DTCs need to be put in the correct positions in the block, which is handled by a remapping unit 813 that performs, for example, the above described process. The output of remapping unit 813 is are the DTCs 412.

Accordingly, as the above illustrates, the transform block may be scanned twice. In the first scan, all positions where the corresponding category has an absolute value of 1 are encoded or parsed. In the second scan, all positions with a corresponding category with an absolute value of 2 or 3 are processed. This step-wise processing has the advantage that the positions where the presence of DTCs is most likely will be processed first, thus moving the last significant coefficient closer to the start of the coefficient map and by that reducing the amount of overall scanned positions.

Significance Map Context Selection (SMCS)

The SMCS procedure (or "tool") also takes advantage of the assigned categories for each coefficient. The tool groups positions which have a similar chance of having significant DTCs together to use the contexts available more efficiently. In the HEVC implementation the context selection is optimized for transform coefficients, which have a quite different distribution compared to DTCs. The SMCS tool reuses the number of contexts but defines a special set of contexts exclusively for delta transform coefficient coding and decoding.

The SMCS tool uses categories to select the context to use for decoding whether or not a coefficient has the value of zero. As stated previously, each coefficient is assigned to a category based on the value of the corresponding original estimated coefficient 500 (e.g., each coefficient or block position is assigned to a category). To select a context is to select a probability model for decoding an encoded syntax element or a part of an encoded syntax element such as a CABAC bin. The decoder keeps statistics of previously decoded syntax elements or parts of syntax elements for at least two contexts. For example, assume that one context A is associated with of one set of categories and one context B is associated with another set of categories. When a syntax element or part of a syntax element C is to be decoded, the decoder determines what category syntax element C belongs to. Thereafter, the decoder determines that e.g. context A should be used for decoding if we assume that the category is associated with context A. The decoder then uses the probability distribution or stored state for context A to decode syntax element C. The decoder then updates the state or probability distribution of context A with the value of C. The decoder is adapting the probabilities used for decoding based on past decoded values. This leads to improved compression efficiency given that the probabilities of past values and the current value are correlated. The adapting granularity is given by the combination of a syntax element (or part of a syntax element) and the context. The use of contexts improves the compression efficiency if the values decoded within one context are more highly correlated than the values decoded within multiple contexts. Including categories as described previously to define the contexts to use for decoding whether coefficients are zero or not improves the compression efficiency substantially.

In an example, a total of 27 contexts for luma and 15 contexts for chroma are used. The first nine contexts of both luma and chroma, respectively, are used for 4×4 transform blocks. They are divided into three groups of three contexts, one group each for category 1, category 2, and category 3. The first context in each group is used for the DC position (the first position in scanning order), the second context is used for the next five positions in scanning order, and the third context is used for the remaining positions. For larger transform blocks the selection differs between luma and chroma. For luma, the contexts for 8×8 transform blocks are also divided into three groups of three contexts each, with one group each being used for category 1, category 2, and category 3. The first context in each group is used for the DC position, the second for all other positions in the top-left 4×4 sub-block, and the third for all remaining positions. 16×16 and 32×32 transform blocks use the remaining nine contexts. These are also divided into three groups of three contexts, one group each for category 1, category 2, and category 3. The first contexts in each group is used for the DC position, the second for all other positions in the top-left 4×4 sub-block, and the third for all remaining positions. For chroma, 8×8 and larger transform blocks use the remaining six contexts. These are divided into three groups consisting of two contexts each, with one group each being used for category 1, category 2, and category 3. The first context in each group is used for the DC position, whereas the second context in each group is used for all other positions.

Figure 9A:
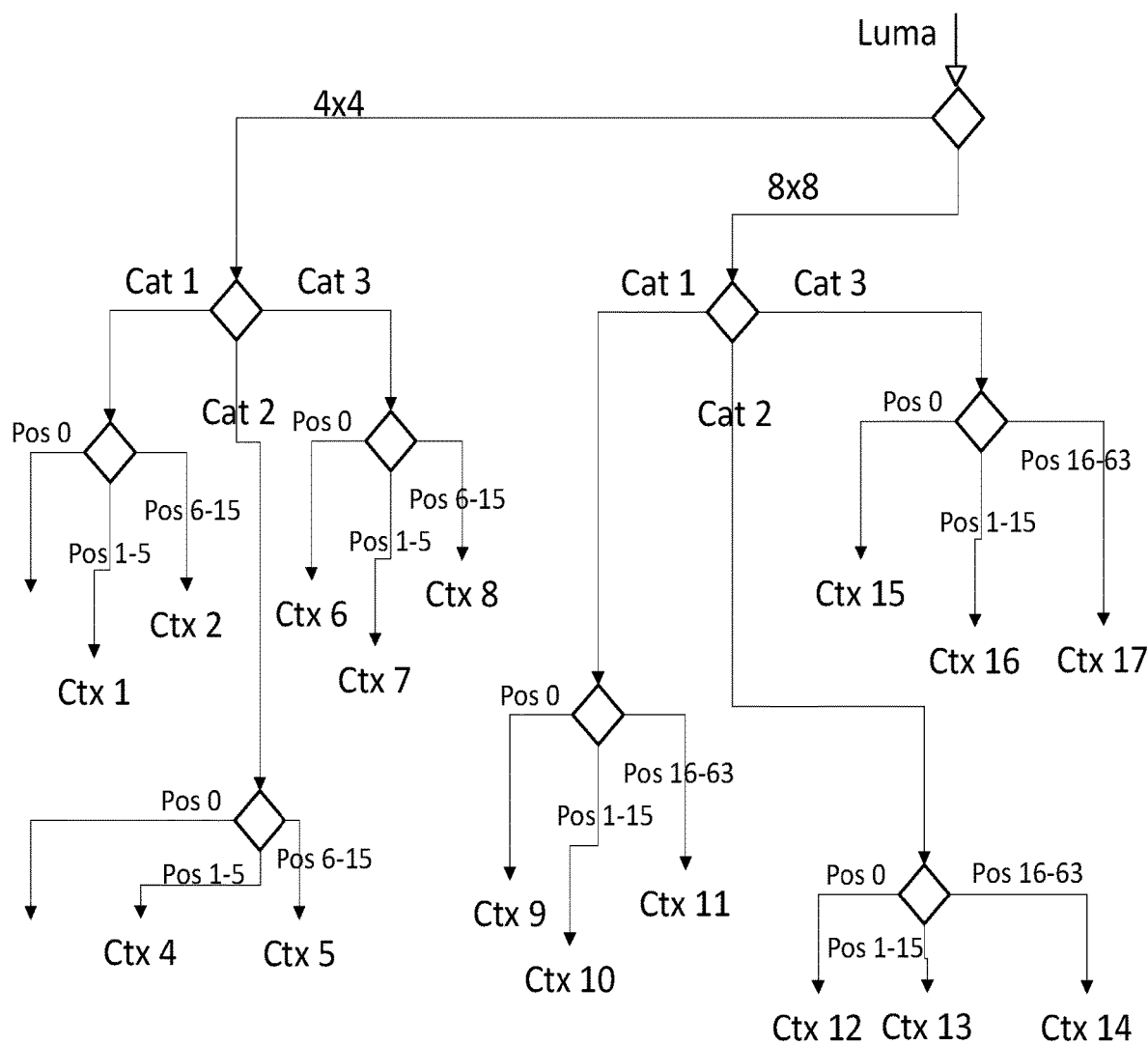
FIG. 9A illustrates a process for selecting a context according to an embodiment.
Figure 9B:
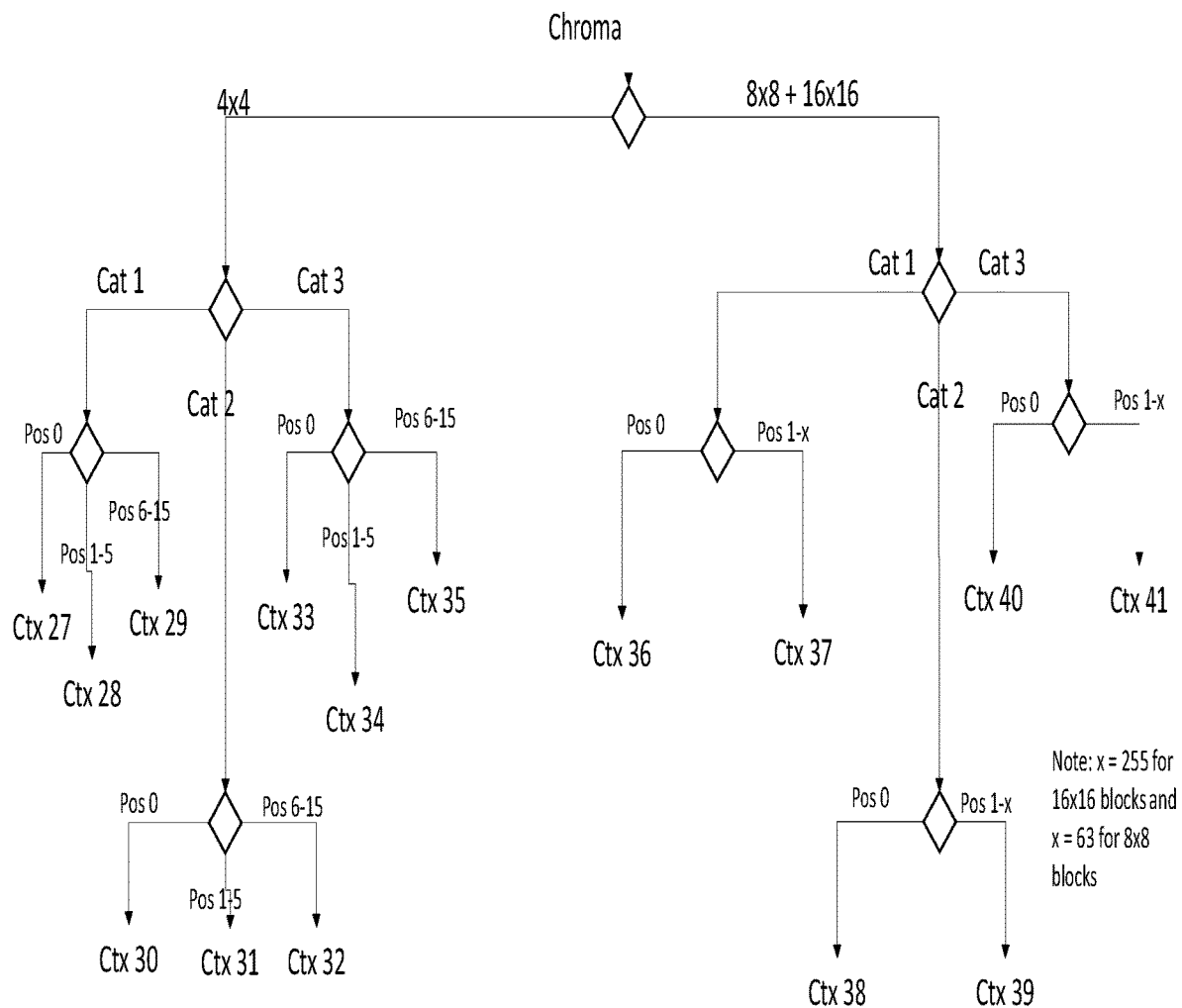
FIG. 9B illustrates a process for selecting a context according to an embodiment.

FIG. 9A is a flow chart showing how the contexts are selected for luma transform coefficient blocks, and FIG. 9B shows the corresponding picture for chroma transform blocks. The goal is to group syntax elements with a similar probability distribution and encode these using the same context, since this allows for better compression.

In the HEVC style coefficient encoding the last position containing a non-zero coefficient in scanning order is signaled as x/y-coordinates. Afterwards, for all preceding positions until the start of the sub-block, one syntax element for each position is encoded to indicate whether the position contains a non-zero coefficient. (See e.g., reference [1] at page 13). These syntax elements use a set of in total 42 contexts. The context to be used depends on channel (luma/chroma), block size, other coefficients in larger transform blocks, and the position that is being encoded.

The SMCS tool changes the function selecting the context. Since the tool has additional information about each position by way of the category, the tool can use this to select a context with a better probability representation for each position. FIG. 9A illustrates the selection process for luma transform blocks.

An example, consider the transform block 705 and assume it is a luma block, you would encode the position of the coefficient with magnitude 1 via x/y-coordinates (2/1, since it is zero-based). For this position, no flag indicating whether the coefficient is non-zero is encoded, since by encoding the position it is implied that there is a non-zero coefficient at that spot. The next coefficient is in position 7 with value 0. Following the flow chart in FIG. 9A, you would select 4×4, category 2, position 6-15, and end up with context 5. The next coefficient is in position 6 with value 0. The selections would again be 4×4, category 2, and position 6-15, so you would use the same context 5. Afterwards, you encode position 5 with value 0. Here you would select 4×4, category 2, and position 1-5, resulting in selecting context 4. Then you move to position 4, where the value is 0. The selection would be 4×4, category 1, and position 1-5. So you would select context 1. The next position is 3, with a coefficient value of 4. Again, the selection would be 4×4, category 1, and position 1-5, resulting in selecting context 1. Positions 2 and 1 would be using the same context (1), whereas position 0 would result in selecting context 0.

Performance

An overview of how the above described tools perform can be found in table 3, below. Gain values are determined by dividing the total storage bit rate of deflation (HQ+all SI) by the total storage bit rate of simulcast (HQ+all LQ). More details can be found in section 6 of reference [2]. The values shown in table 3 are the difference between two different deflation variants. The column Gain (tool only) compares the performance of deflation using the respective tool with a baseline variant of deflation without taking other tools into account. The column Gain (in presence of other tools) evaluates the performance of each tool with a variant of deflation where all other tools are active as well. The Complexity Deflation column shows the relative run-time between running deflation with all tools and running deflation with all tools except for the tested one, with the latter one being defined as 100%. The Complexity Inflation column shows the relative run-times for inflation, calculated in the same way as for deflation before. The All tools row shows the total gain and complexity of deflation and inflation, respectively, with all tools compared to a baseline variant without all tools.

TABLE 3

Performance Evaluation of Proposed Tools

| Tool | Gain (tool only) | Gain (in presence of other tools) | Complexity Deflation | Complexity Inflation |
|---|---|---|---|---|
| Sign Guess | 2.25% | 2.96% | 101.0% | 102.0% |
| Remapping | 1.25% | 0.79% | 102.4% | 103.2% |
| Significance Map Context Selection | 1.11% | 0.64% | 100.4% | 100.5% |
| All tools | 4.25% | — | 103.9% | 105.3% |

It will be appreciated that the methods, method steps, devices, and device functions described herein can be implemented, combined and re-arranged in a variety of ways. For example, embodiments may be implemented in hardware, or in software for execution by suitable processing circuitry, or a combination thereof. The steps, functions, procedures, modules and/or blocks described herein may be implemented in hardware using any conventional technology, such as discrete circuit or integrated circuit technology, including both general-purpose electronic circuitry and application-specific circuitry. Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

Figure 10:
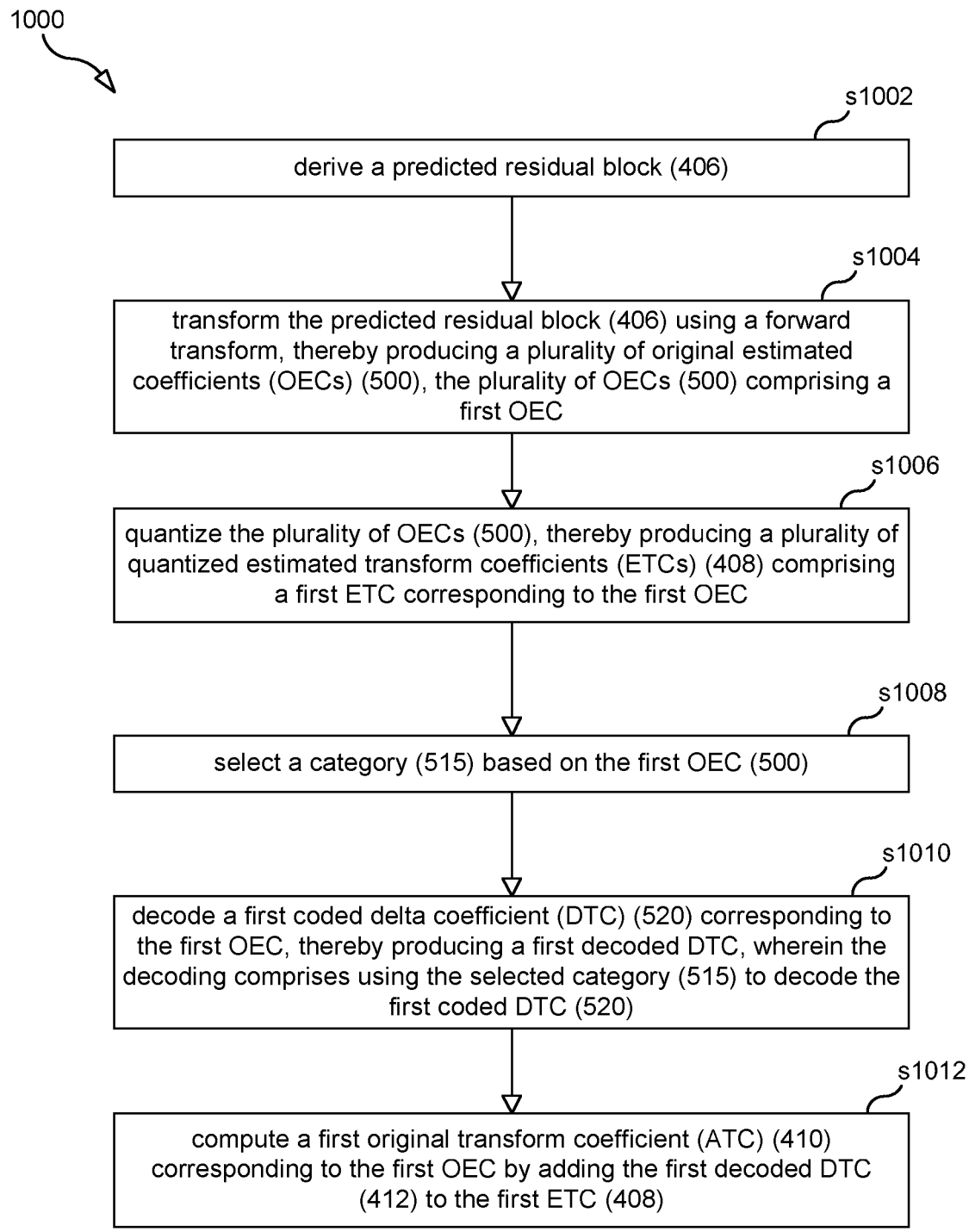
FIG. 10 is a flow chart illustrating a decoding process according to an embodiment.

FIG. 10 is a flow chart illustrating a process 1000, which may be performed by a guided transcoder (e.g., guided transcoder 100, 110, 120 described below). Process 1000 may begin in step s1002 in which the guided transcoder derives a predicted residual block 406. In step s1004, the guided transcoder transforms the predicted residual block 406 using a forward transform, thereby producing a plurality of original estimated coefficients (OECs) 500, the plurality of OECs 500 comprising a first OEC. In step s1006, the guided transcoder quantizes the plurality of OECs 500, thereby producing a plurality of quantized estimated transform coefficients (ETCs) 408 comprising a first ETC corresponding to the first OEC. In step s1008, the guided transcoder selects a category based on the first OEC. In step s1010, the guided transcoder decodes a first coded DTC corresponding to the first OEC, thereby producing a first decoded DTC, wherein the decoding comprises using the selected category to decode the first coded DTC. In step s1012, the guided transcoder computes a first original transform coefficient (ATC) corresponding to the first OEC by adding the first decoded DTC to the first ETC.

Figure 11:
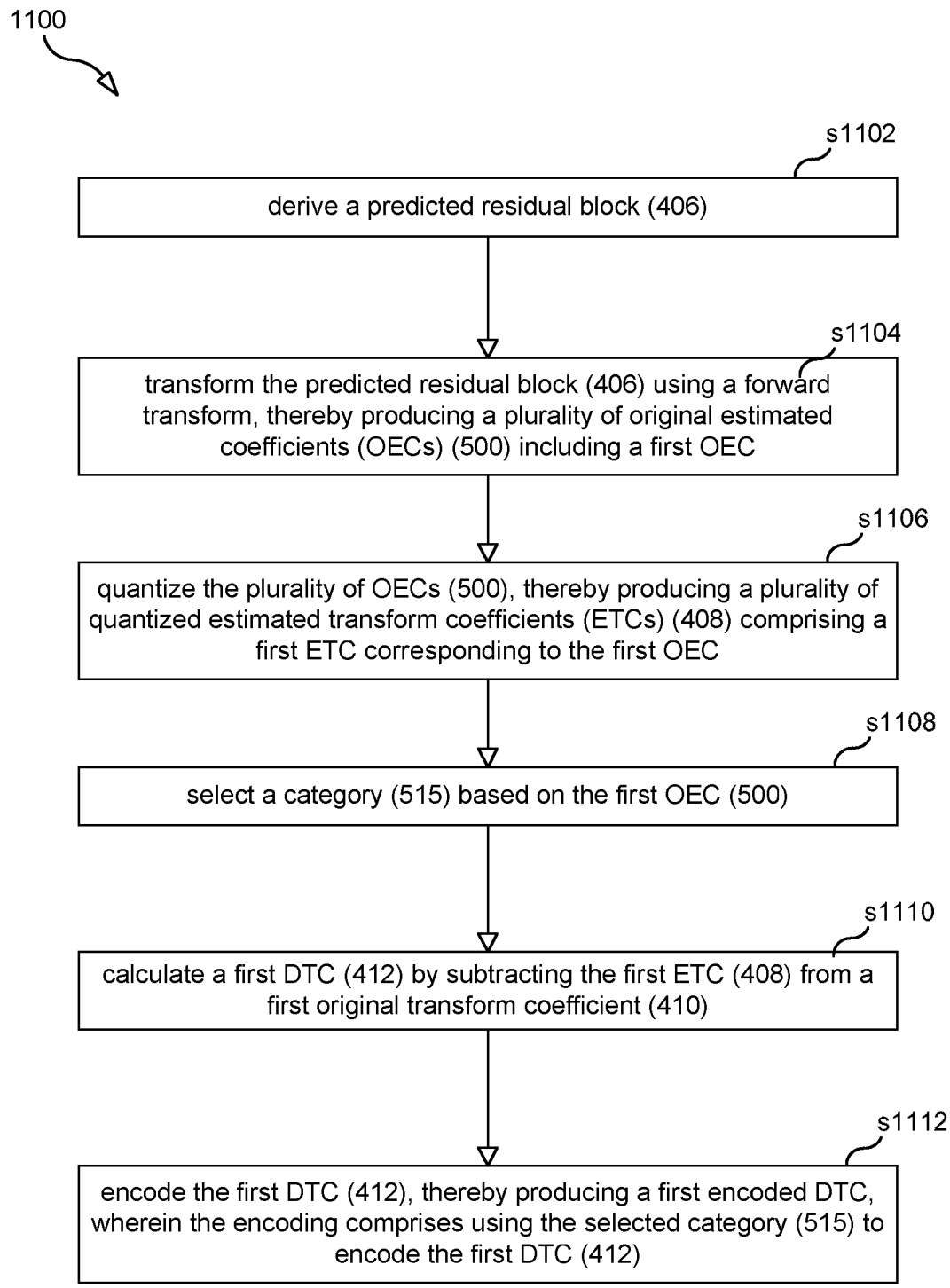
FIG. 11 is a flow chart illustrating an encoding process according to an embodiment.

FIG. 11 is a flow chart illustrating a process 1100, which may be performed by a guided transcoder (e.g., guided transcoder 100, 110, 120 described below). Process 1100 may begin in step s1102 in which the guided transcoder derives a predicted residual block 406. In step s1104, the guided transcoder transforms the predicted residual block 406 using a forward transform, thereby producing a plurality of original estimated coefficients (OECs) 500, the plurality of OECs 500 comprising a first OEC. In step s1106, the guided transcoder quantizes the plurality of OECs 500, thereby producing a plurality of quantized estimated transform coefficients (ETCs) 408 comprising a first ETC corresponding to the first OEC. In step s1108, the guided transcoder selects a category based on the first OEC. In step s1110, the guided transcoder calculates a first DTC by subtracting the first ETC from a first original transform coefficient (ATC) (410). In step s1110, the guided transcoder encodes the first DTC, thereby producing a first encoded DTC, wherein the encoding comprises using the selected category to encode the first DTC.

Figure 12:
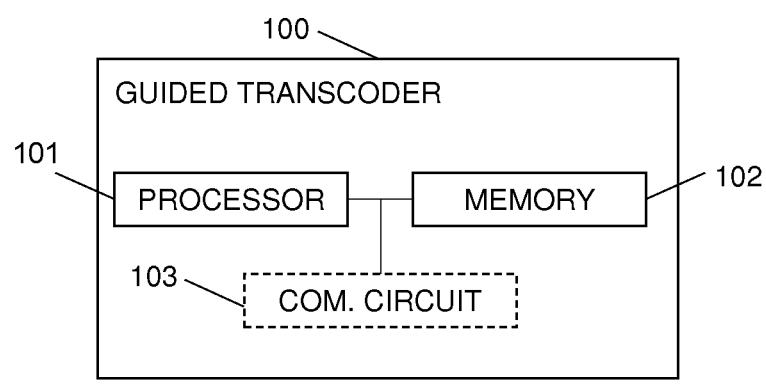
FIG. 12 is a schematic illustration of a guided transcoder according to an embodiment.

FIG. 12 is a schematic block diagram illustrating an example of a guided transcoder 100, based on a processor-memory implementation according to an embodiment. In this particular example, the guided transcoder 100 comprises a processor 101 and a memory 102. The memory 102 comprises instructions executable by the processor 101. In an embodiment, the processor 101 is operative to encode DTCs of a pixel block based on the selected categories 515, which are selected based on OECs, as described above. In another embodiment, the processor 101 is operative to decode the DTCs of the pixel block based on the selected categories 515. Optionally, the guided transcoder 100 may also include a communication circuit 103. The communication circuit 103 may include functions for wired and/or wireless communication with other devices and/or network nodes in the wireless communication network. In a particular example, the communication circuit 103 may be based on radio circuitry for communication with one or more other nodes, including transmitting and/or receiving information. The communication circuit 103 may be interconnected to the processor 101 and/or memory 102. By way of example, the communication circuit 103 may include any of the following: a receiver, a transmitter, a transceiver, input/output (I/O) circuitry, input port(s) and/or output port(s).

Figure 13:
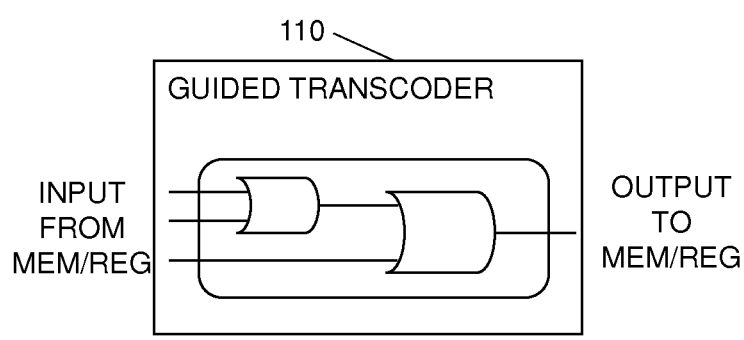
FIG. 13 is a schematic illustration of a guided transcoder according to another embodiment.

FIG. 13 is a schematic block diagram illustrating another example of a guided transcoder 110 for performing the guided transcoding processes described above, based on a hardware circuitry implementation according to an embodiment. Particular examples of suitable hardware circuitry include one or more suitably configured or possibly reconfigurable electronic circuitry, e.g. Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 14:
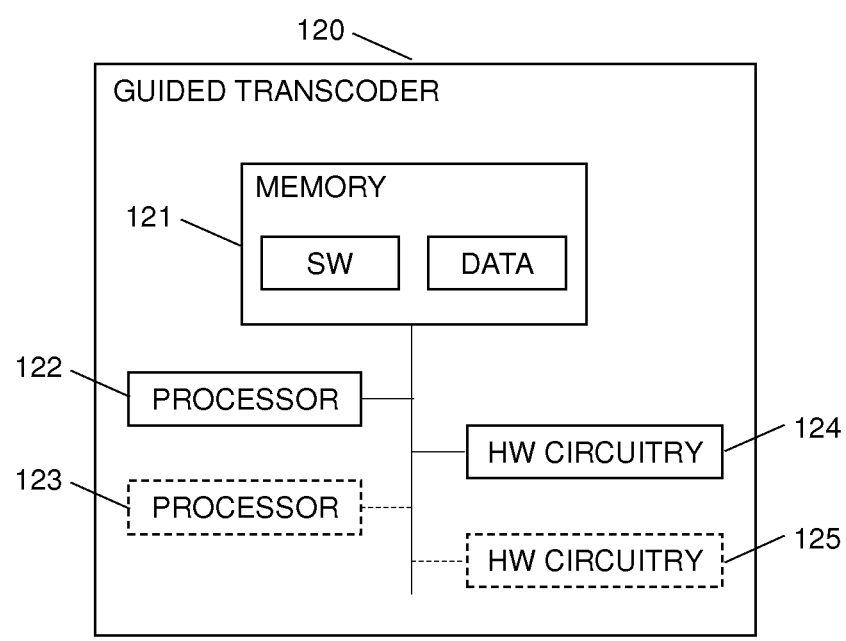
FIG. 14 is a schematic illustration of a guided transcoder according to a further embodiment.

FIG. 14 is a schematic block diagram illustrating yet another example of a guided transcoder 120 for performing the guided transcoding processes described above, based on combination of both processor(s) 122, 123 and hardware circuitry 124, 125 in connection with suitable memory unit(s) 121. The guided transcoder 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more preconfigured or possibly reconfigurable hardware circuits 124, 125. The actual hardware-software partitioning can be decided by a system designer based on a number of factors including processing speed, cost of implementation and other requirements.

Figure 15:
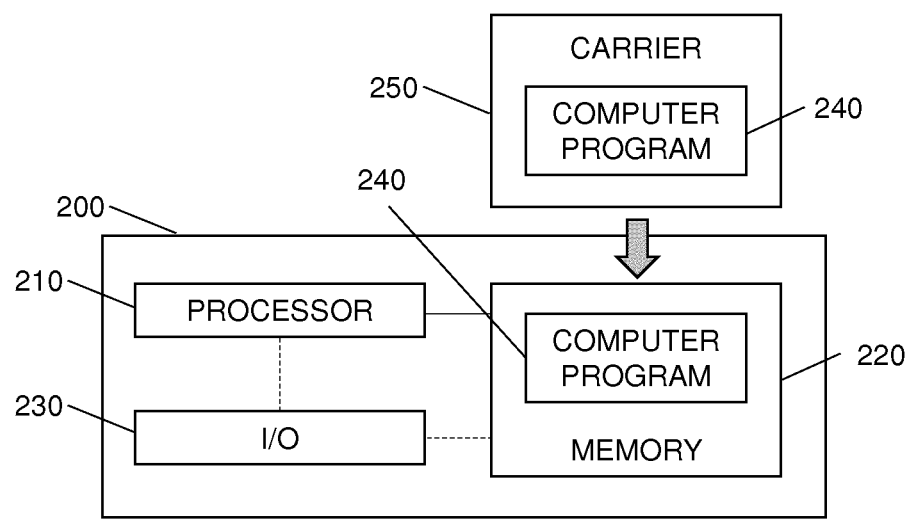
FIG. 15 is a schematic block diagram of a computer-program-based implementation of an embodiment.

FIG. 15 is a schematic diagram illustrating an example of a computer-implementation of 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional input/output device 230 may also be interconnected to the processor(s) 210 and/or the memory 220 to enable input and/or output of relevant data such as video sequences, encoded video sequences and requests for video sequences. The term 'processor' should be interpreted in a general sense as any system or device capable of executing program code or computer program instructions to perform a particular processing, determining or computing task. The processing circuitry including one or more processors 210 is thus configured to perform, when executing the computer program 240, well-defined processing tasks such as those described herein. The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to encode DTCs of a pixel block in a picture in a first representation of a video sequence based on selected categories 515, which are selected based on OECs, as described herein. The DTCs represent a difference between ATCs of the pixel block derived by encoding at least a portion of the picture in the first representation of the video sequence and the ETCs. As described above, the ETCs represent a difference between a reconstructed block of a corresponding picture in a second representation of the video sequence and a prediction block obtained based on intra mode information and/or inter motion information derived by encoding the picture in the first representation of the video sequence.

In another particular embodiment, the computer program 240 comprises instructions, which when executed by at least one processor 210, cause the at least one processor 210 to decode coded DTCs of a pixel block in a picture in a first representation of a video sequence based on selected categories 515, which are selected based on OECs, as described herein.

In further embodiments, the computer program 240 comprises instructions, which when executed by the at least one processor 210 cause the at least one processor to perform any of the previously described encoding or decoding embodiments.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a non-transitory computer-readable storage medium.

By way of example, the software or computer program 240 may be realized as a computer program product, which is normally carried or stored on a computer-readable medium 250, in particular a non-transitory medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a computer or equivalent processing device 200 for execution by the processing circuitry 210 thereof.

The flow diagram or diagrams presented herein may be regarded as a computer flow diagram or diagrams, when performed by one or more processors. A corresponding guided transcoder may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 16:
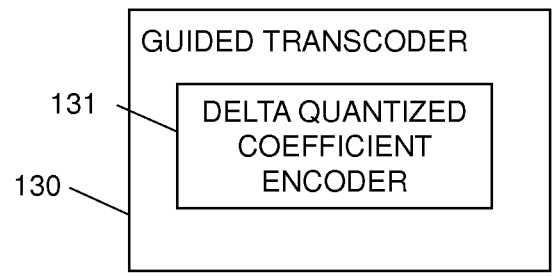
FIG. 16 is a schematic illustration of a guided transcoder according to yet another embodiment.

FIG. 16 is a schematic diagram illustrating an example of a guided transcoder 130 comprising a DTC encoder 131 for encoding DTCs of a pixel block in a picture in a first representation of a video sequence based on selected categories 515, which are selected based on OECs, as described herein.

Figure 17:
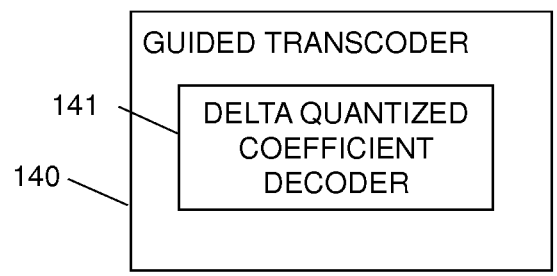
FIG. 17 is a schematic illustration of a guided transcoder according to a further embodiment.

FIG. 17 is a schematic diagram illustrating another example of a guided transcoder 140 comprising a DTC decoder 141 for decoding encoded DTCs of a pixel block in a picture in a first representation of a video sequence based on selected categories 515, which are selected based on OECs, as described herein.

Figure 18:
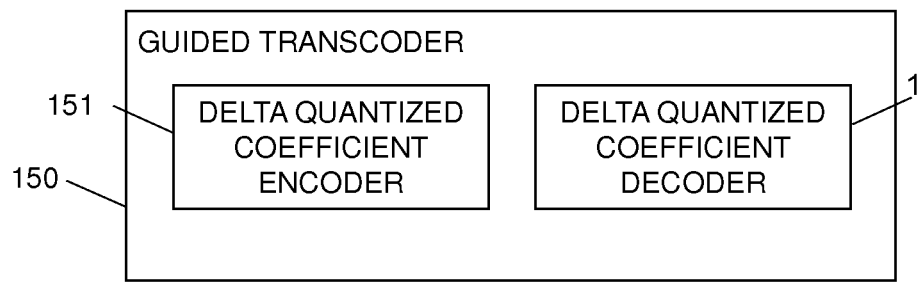
FIG. 18 is a schematic illustration of a guided transcoder according to an embodiment.

FIG. 18 is a schematic diagram illustrating a further example of a guided transcoder 150. This guided transcoder 150 comprises both DTC encoder 131 and DTC decoder 141.

It is becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 19:
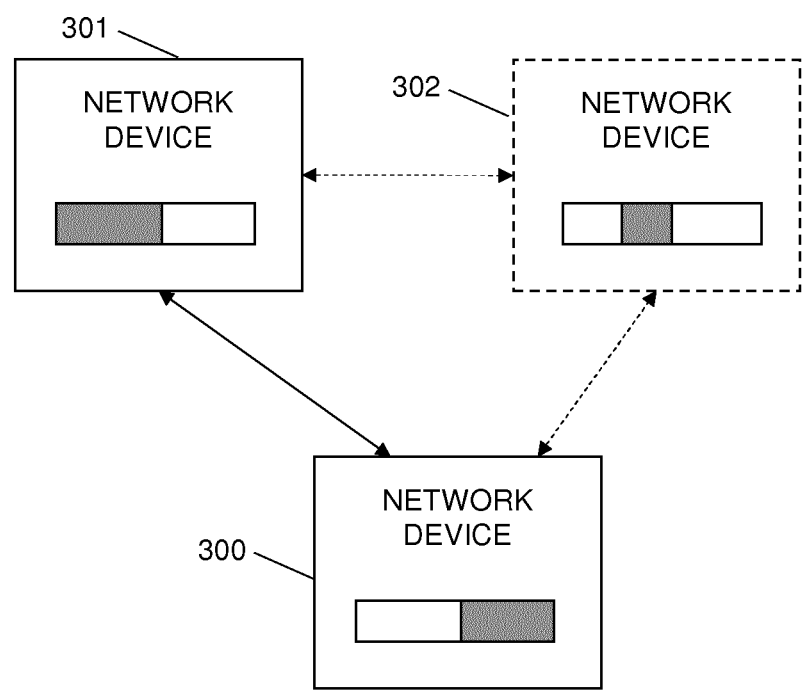
FIG. 19 schematically illustrates a distributed implementation among multiple network devices.

FIG. 19 is a schematic diagram illustrating an example of how functionality can be distributed or partitioned between different network devices in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 20:
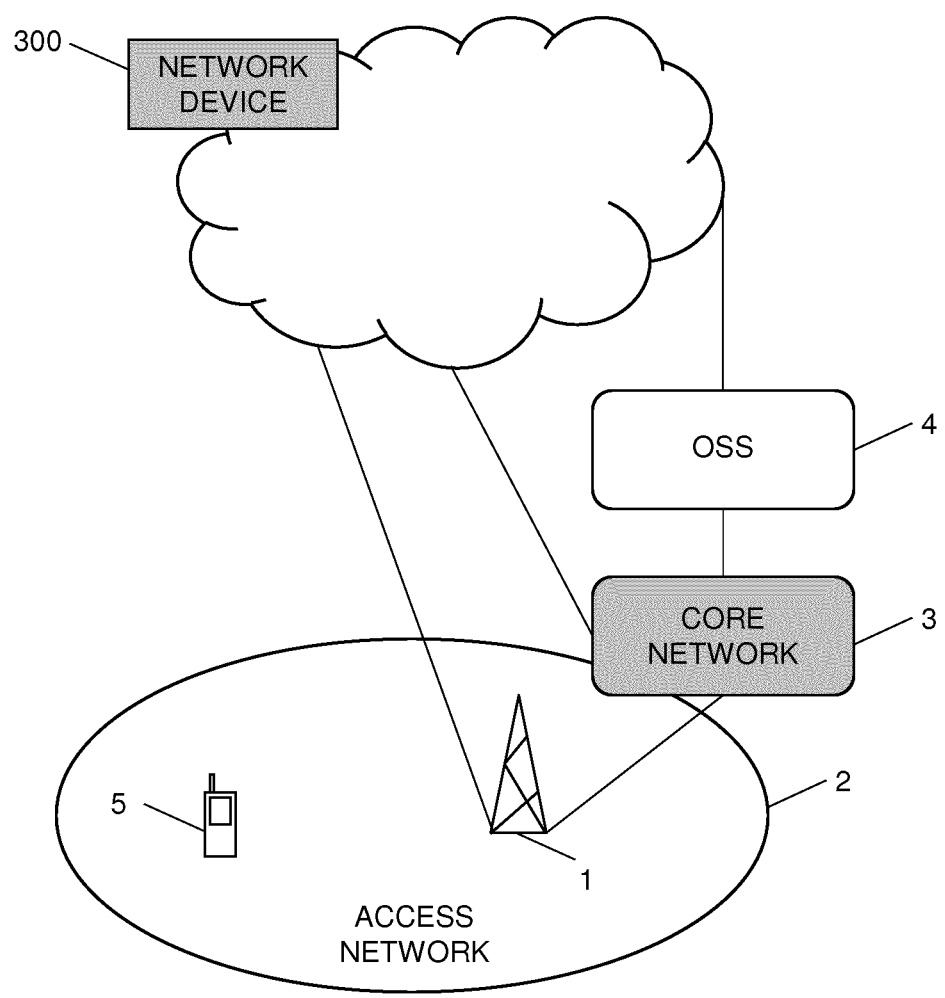
FIG. 20 is a schematic illustration of an example of a wireless communication system with one or more cloud-based network devices according to an embodiment.
Figure 21:
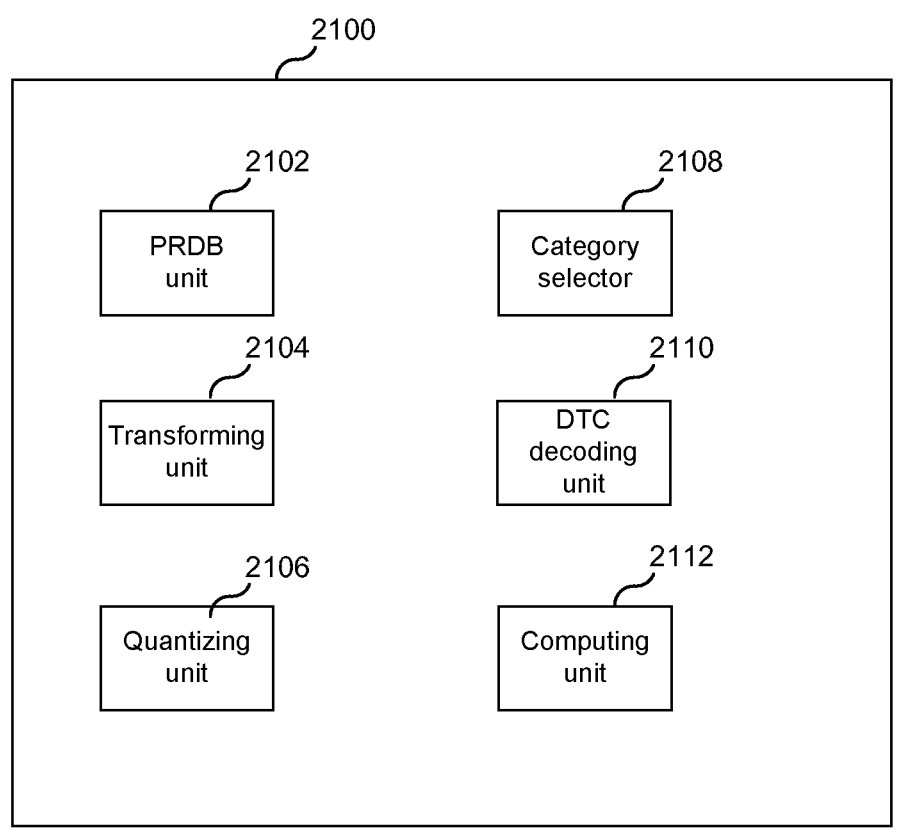
FIG. 21 is a diagram showing functional units of a DTC decoder according to an embodiment.
Figure 22:
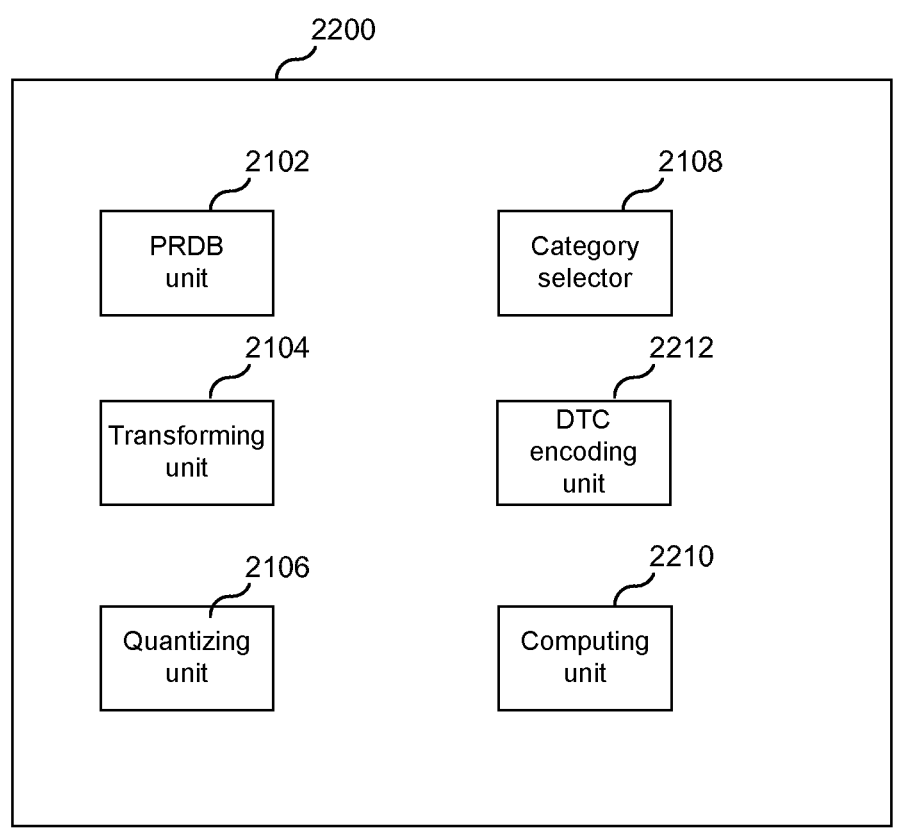
FIG. 22 is a diagram showing functional units of a DTC encoder according to an embodiment.

FIG. 20 is a schematic diagram illustrating an example of a wireless communication network or system, including an access network 2 and/or a core network 3 and/or an operations and support system (OSS), 4 in cooperation with one or more cloud-based network devices 300. The figure also illustrates a user device 5 connected to the access network 2 and capable of conducting wireless communication with a base station representing an embodiment of a wireless communication device 1.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] Christopher Hollmann. Coding of Guiding Data for Video Transcoding, Master's thesis, Uppsala University, Department of Information Technology, 2017.
[2] MPEG Requirements. Call for Evidence on Transcoding for Network Distributed Video Coding, MPEG output document N17058, Torino, Italy, July 2017

ABBREVIATIONS

HEVC High Efficiency Video Coding
HQ High Quality
LQ Low Quality
NDVC Network-Distributed Video Coding
SI Side Information
VoD Video on Demand

The invention claimed is:

1. A method for decoding of coded delta transform coefficients, the method comprising: deriving a predicted residual block; transforming the predicted residual block using a forward transform, thereby producing a plurality of original estimated coefficients (OECs), the plurality of OECs comprising a first original estimated coefficient; quantizing the plurality of OECs, thereby producing a plurality of quantized estimated transform coefficients (ETCs) comprising a first quantized ETC corresponding to the first original estimated coefficient; determining a category based on the first original estimated coefficient (OEC); decoding a first coded delta transform coefficient (DTC) corresponding to the first OEC, thereby producing a first decoded DTC, wherein the decoding comprises using the determined category to decode the first coded DTC, and computing a first original transform coefficient by adding the first decoded DTC to the first ETC, wherein the first OEC has a value, determining the category based on the first OEC comprises determining the category based on the value of the first OEC, and determining the category based on the value of the first OEC comprises: obtaining an unquantized level using the value of the first OEC; determining difference between a reconstructed level and the unquantized level; and determining the category based on the determined difference.

2. The method of claim 1, wherein the decoding comprises deriving a predicted sign for the first decoded DTC based on the selected category.

3. The method of claim 2, wherein the decoding further comprises: obtaining encoded flag information that contains a first flag value corresponding to the first decoded DTC; decoding the encoded flag information to obtain the first flag value; if the first flag value indicates that the sign of the first decoded DTC is equal to the predicted sign, setting the sign of the first decoded DTC such that the sign of the first decoded DTC is the same as the predicted sign, and if the first flag value indicates that the sign of the first decoded DTC is not equal to the predicted sign, setting the sign of the first decoded DTC such that the sign of the first decoded DTC is the opposite of the predicted sign.

4. The method of claim 1, wherein the decoding comprises using a scanning pattern which first processes all coded DTCs which belong to one or several particular categories, followed by processing of all coded DTCs which belong to one or several different particular categories.

5. The method of claim 1, wherein the decoding comprises: obtaining a first ordered block of decoded DTCs, wherein each decoded DTC in the first ordered block of DTCs is associated with a category; obtaining category information that associates each position in the block with a category; and remapping the decoded DTCs to produce a second ordered block of decoded DTCs, using the obtained category information.

6. The method of claim 5, wherein the first ordered block of decoded DTCs comprises N decoded DTCs, wherein each of the N decoded DTCs is associated with a category that is included in a first set of categories, the first ordered block of decoded DTCs comprises M decoded DTCs, wherein each of the M decoded DTCs is associated with a category that is not included in said first set of categories, and each one of the N decoded DTCs is positioned in one of the first N positions of the first ordered block.

7. The method of claim 1, wherein decoding the coded DTCs into decoded DTCs comprises: selecting a decoding context for a flag indicating whether a position contains a non-zero decoded DTC based on the determined category, and the size of the transform block, and optionally the position of the decoded DTC in the transform block; and decoding the flag indicating whether a position contains a non-zero decoded DTC based on the selected decoding context.

8. A method for encoding delta transform coefficients (DTCs), the method comprising: deriving predicted residual block; transforming the predicted residual block using a forward transform, thereby producing a plurality of original estimated coefficients (OECs) including a first original estimated coefficient; quantizing the plurality of OECs, thereby producing a plurality of quantized estimated transform coefficients (ETCs) comprising a first quantized ETC; selecting a category based on the first original estimated coefficient (OEC); calculating a first DTC by subtracting the first ETC from a first original transform coefficient (QC); and encoding the first DTC, thereby producing a first encoded DTC, wherein the encoding comprises using the selected category to encode the first DTC, wherein the first OEC has a value, and determining the category based on the first OEC comprises determining the category based on the value of the first OEC, and determining the category based on the value of the first OEC comprises: obtaining an unquantized level using the value of the first OEC; determining difference between a reconstructed level and the unquantized level; and determining the category based on the determined difference.

9. The method of claim 8, wherein the encoding comprises deriving a predicted sign for the first encoded DTC based on the selected category.

10. The method of claim 9, wherein the encoding further comprises: determining whether the predicted sign is equal to the sign of the first encoded DTC; and producing encoded flag information that encodes a plurality of flag values, the plurality of flag values including a first flag value corresponding to the first encoded DTC, wherein the first flag value indicates whether or not the predicted sign is equal to the sign of the first encoded DTC.

11. The method of claim 8, wherein encoding the DTCs into coded DTCs comprises using a scanning pattern, which first processes all DTCs which belong to one or several particular categories, followed by processing of all DTCs which belong to one or several different particular categories.

12. The method of claim 8, wherein the encoding comprises: producing a first ordered block of DTCs, wherein each DTC in the first ordered block of DTCs is associated with a category; producing category information that associates each position in the block with a category; and reordering the first ordered block of DTCs to produce a second ordered block of DTCs, using the category information.

13. The method of claim 12, wherein the first ordered block of DTCs comprises N DTCs, wherein each of the N decoded DTCs is associated with a category that is included in a first set of categories, the first ordered block of DTCs comprises M DTCs, wherein each of the M decoded DTCs is associated with a category that is not included in said first set of categories, and each one of the N DTCs is positioned in one of the first N positions of the second ordered block.

14. The method of claim 12, further comprising encoding the second ordered block of DTCs in accordance with a scan order.

15. The method of claim 8, wherein encoding the DTCs into coded DTCs comprises: selecting an encoding context for a flag indicating whether a position contains a non-zero DTC based on a category, and the size of the transform block, and optionally the position of the DTC in the transform block; and encoding the flag indicating whether a position contains a non-zero DTC based on the selected encoding context.

16. The method of claim 1, wherein determining a category based on the first original estimated coefficient comprises: determining an unquantized level using the value of the first original estimated coefficient; quantizing the unquantized level into a quantized level; reconstructing the quantized level into a reconstructed level; calculating the remainder between the unquantized level and the reconstructed level; and determining a category depending on the remainder and the sign of the first original estimated coefficient.

17. An apparatus, the apparatus comprising: a memory; and processing circuitry coupled to the memory, wherein the apparatus is configured to: derive a predicted residual block; transform the predicted residual block using a forward transform, thereby producing a plurality of original estimated coefficients (OECs), the plurality of OECs comprising a first OEC; quantize the plurality of OECs, thereby producing a plurality of quantized estimated transform coefficients (ETCs) comprising a first ETC corresponding to the first OEC; select a category based on the first OEC; decode a first coded delta transform coefficient (DTC) corresponding to the first OEC, thereby producing a first decoded DTC, wherein the decoding comprises using the selected category to decode the first coded DTC, and compute a first original transform coefficient by adding the first decoded DTC to the first ETC, wherein the first OEC has a value, and selecting the category based on the first OEC comprises selecting the category based on the value of the first OEC, and selecting the category based on the value of the first OEC comprises: obtaining an unquantized level using the value of the first OEC; determining difference between a reconstructed level and the unquantized level; and determining the category based on the determined difference.

18. An apparatus, the apparatus comprising a memory; and processing circuitry coupled to the memory, wherein the apparatus is configured to: derive predicted residual block; transform the predicted residual block using a forward transform, thereby producing a plurality of original estimated coefficients (OECs) including a first OEC; quantize the plurality of OECs, thereby producing a plurality of quantized estimated transform coefficients (ETCs) comprising a first ETC; select a category based on the first OEC; calculate a first DTC by subtracting the first ETC from a first original transform coefficient (QC); and encode the first DTC, thereby producing a first encoded DTC, wherein the encoding comprises using the selected category to encode the first DTC, wherein the first OEC has a value, and selecting the category based on the first OEC comprises selecting the category based on the value of the first OEC, and selecting the category based on the value of the first OEC comprises: obtaining an unquantized level using the value of the first OEC; determining difference between a reconstructed level and the unquantized level; and determining the category based on the determined difference.

19. A computer program product comprising a non-transitory computer readable medium storing a computer program comprising instructions which when executed by processing circuitry causes the processing circuitry to carry out the method of claim 1.

20. The method of claim 1, wherein determining the category based on the determined difference comprises determining the category based on the determined difference and on a sign of the value of the first OEC.

21. The method of claim 1, wherein the value of the first OEC has a sign, and determining the category based on the first OEC comprises determining the category based on the value of the first OEC and the sign of the value.

* * * * *